United States Patent Office 2,955,342
Patented Oct. 11, 1960

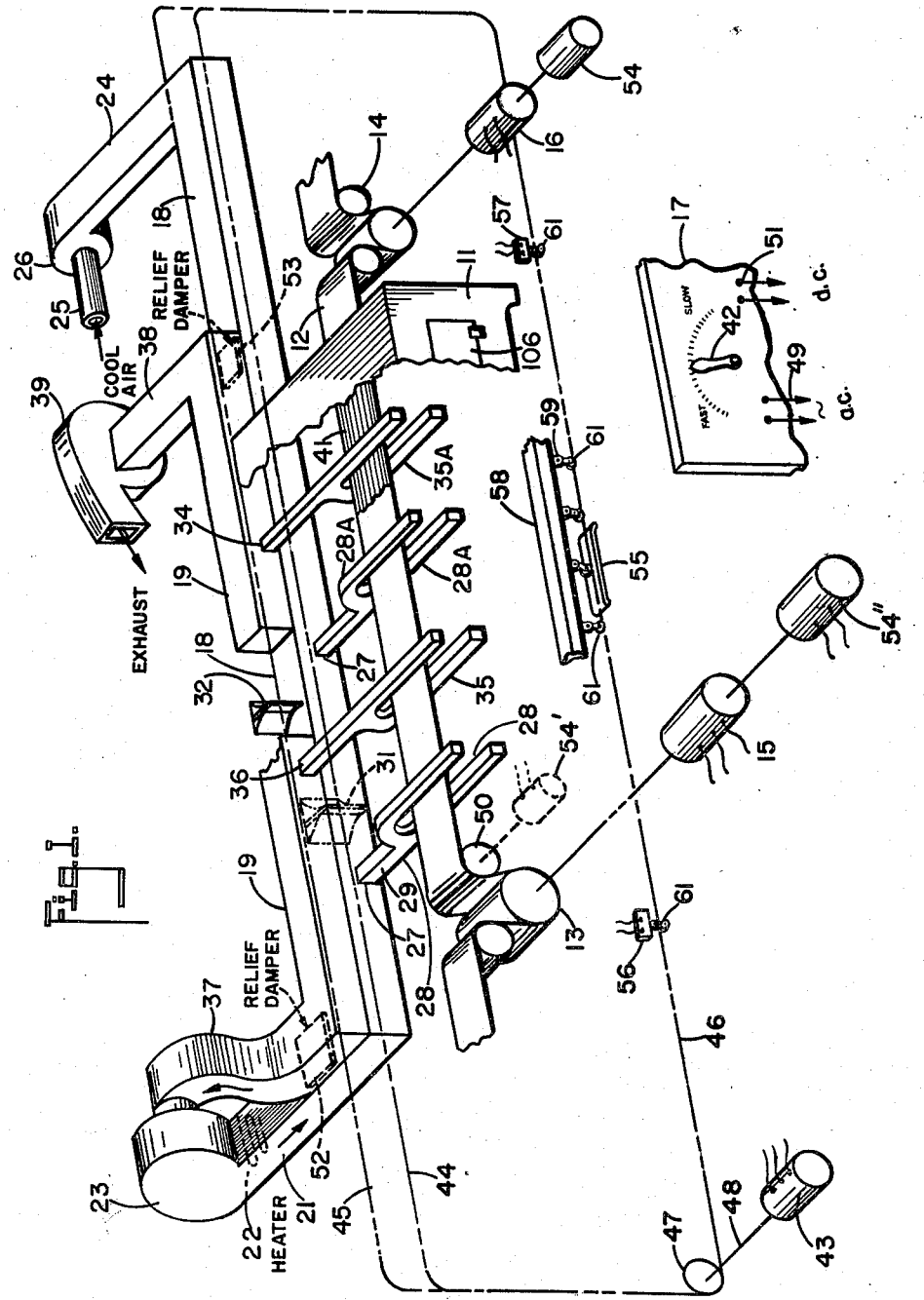

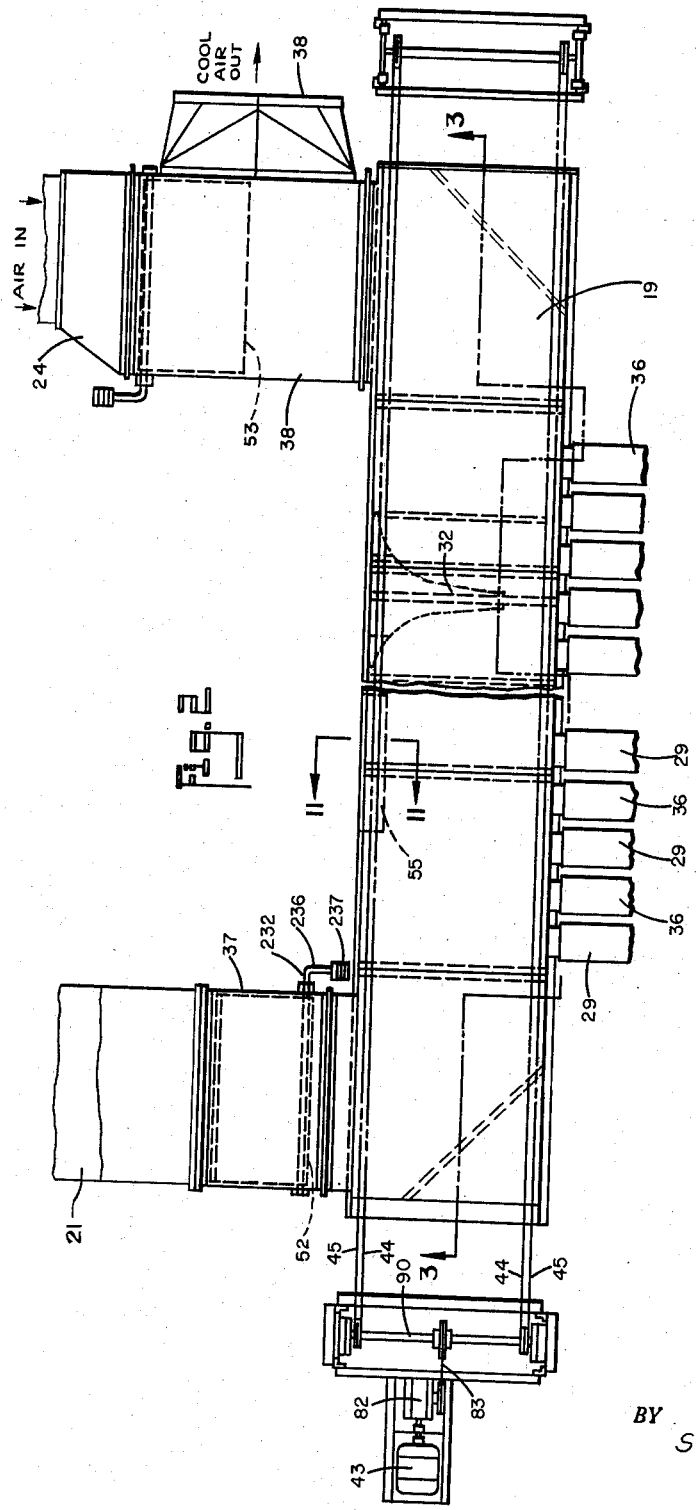

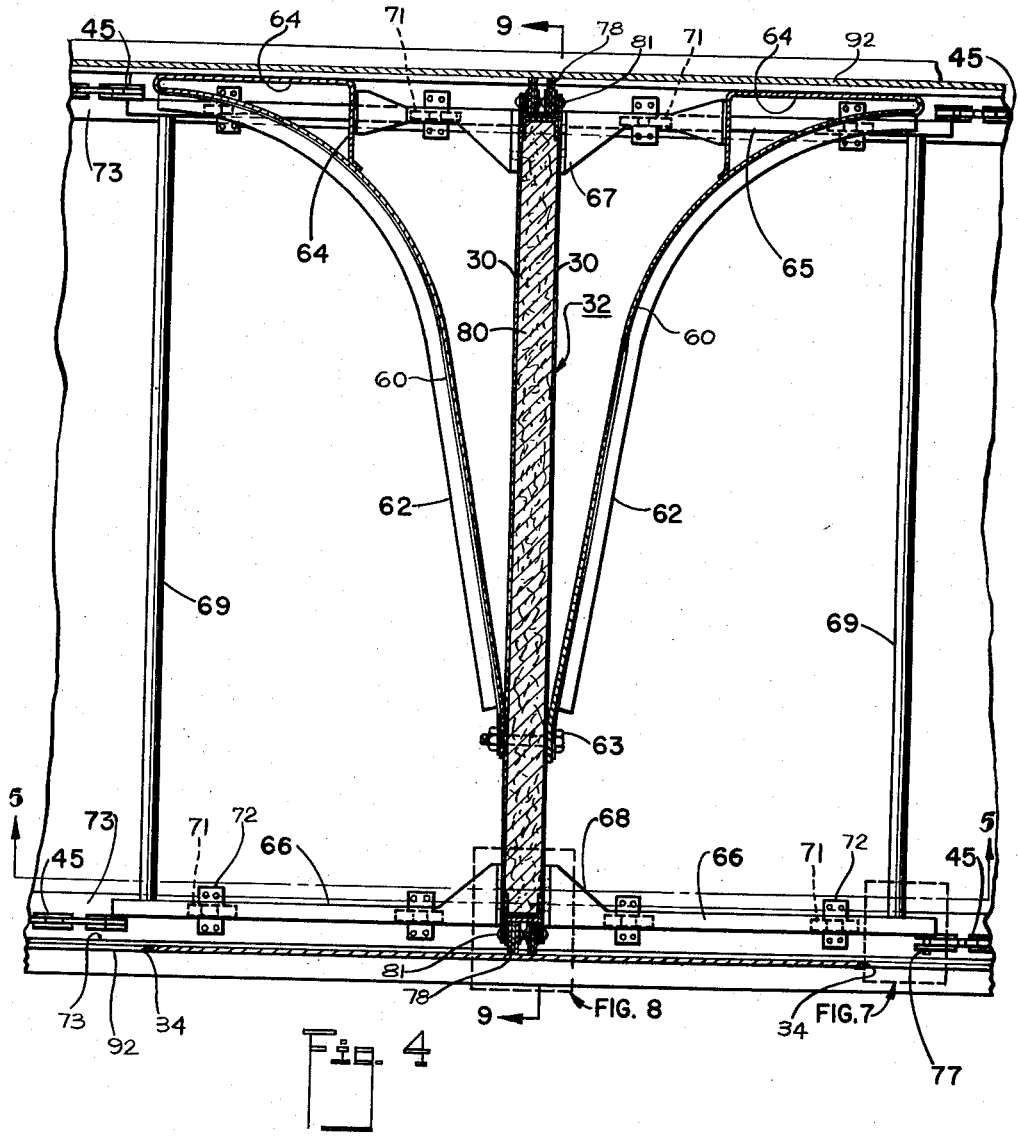

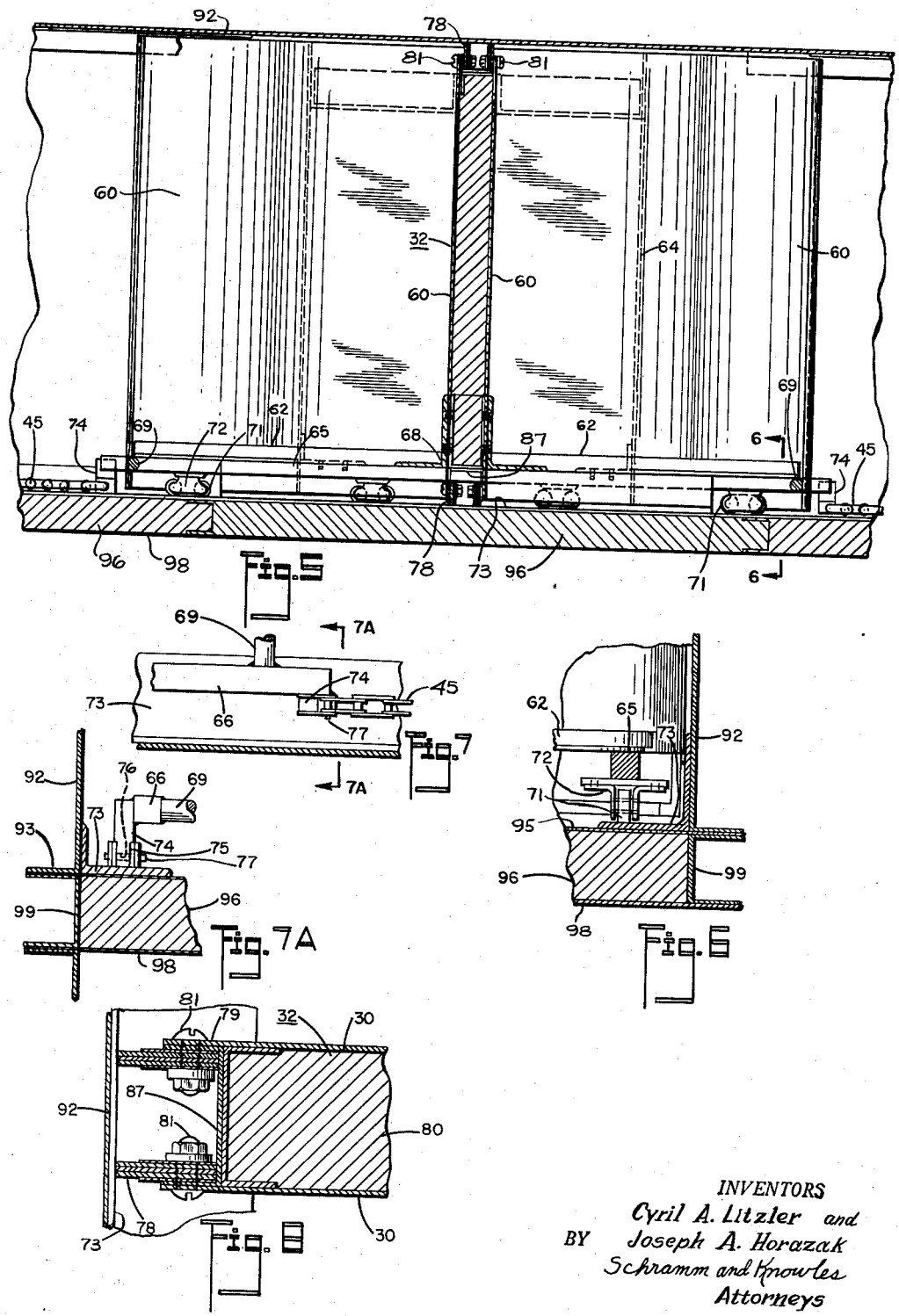

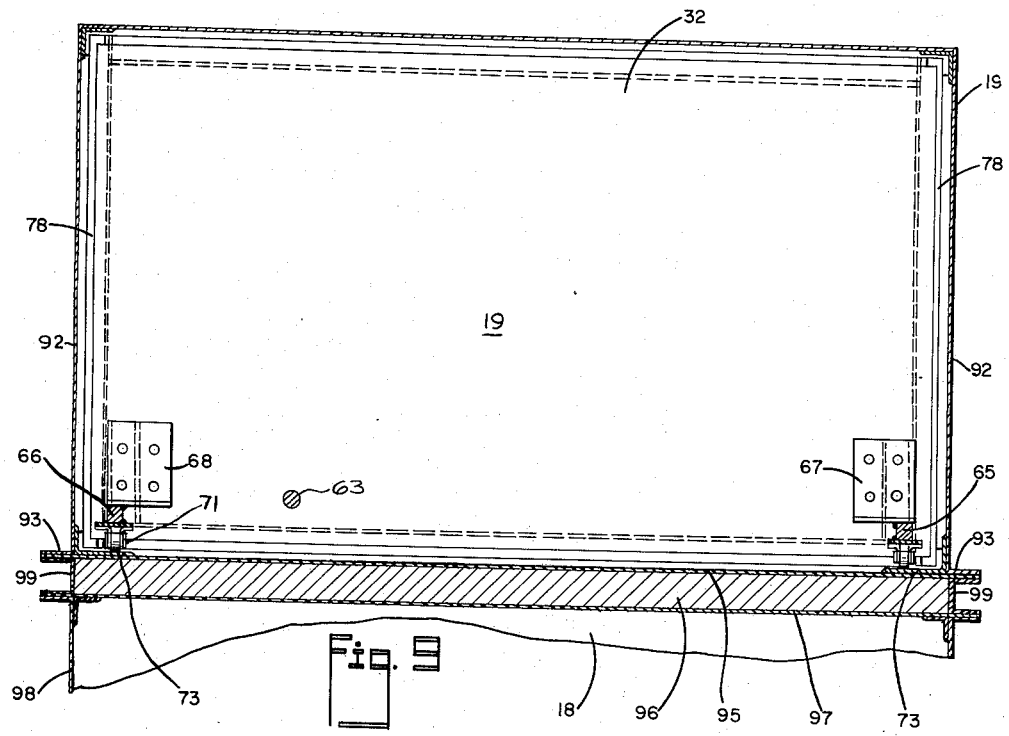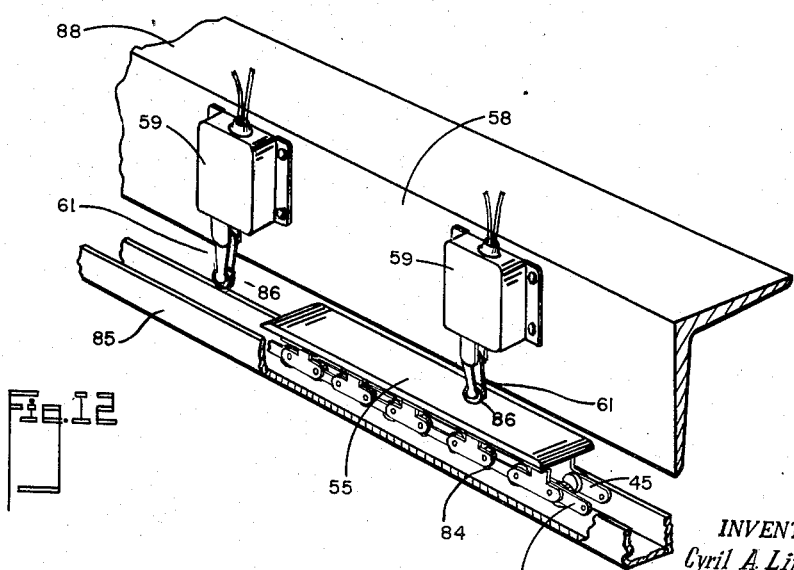

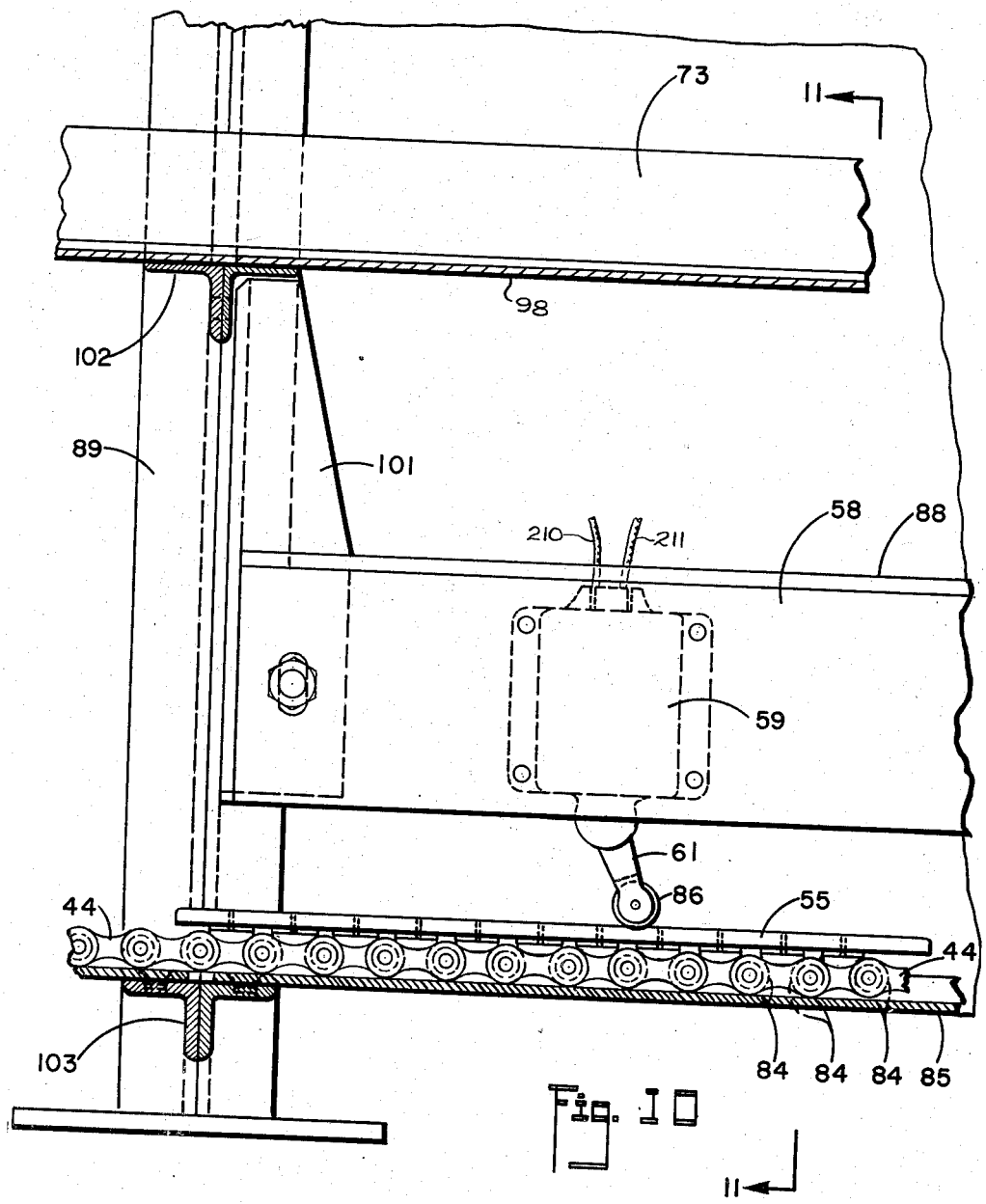

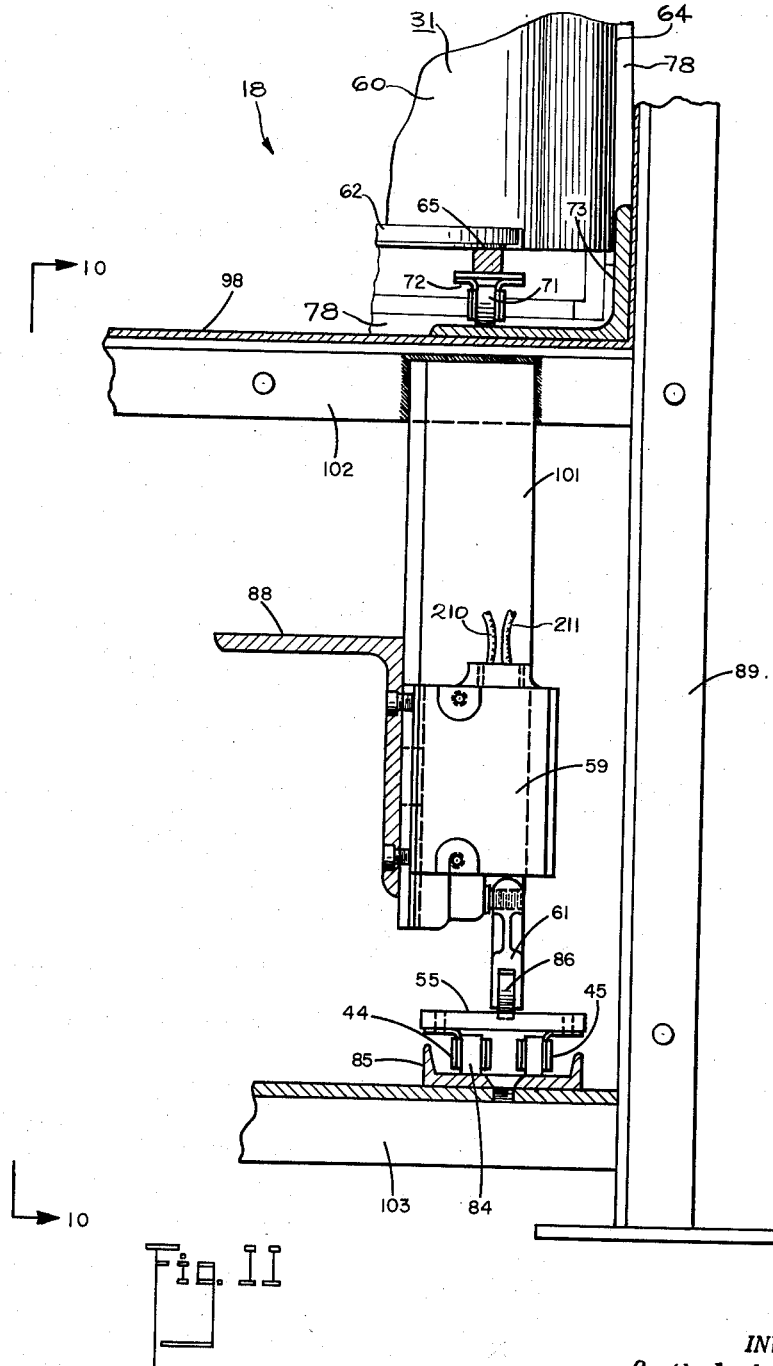

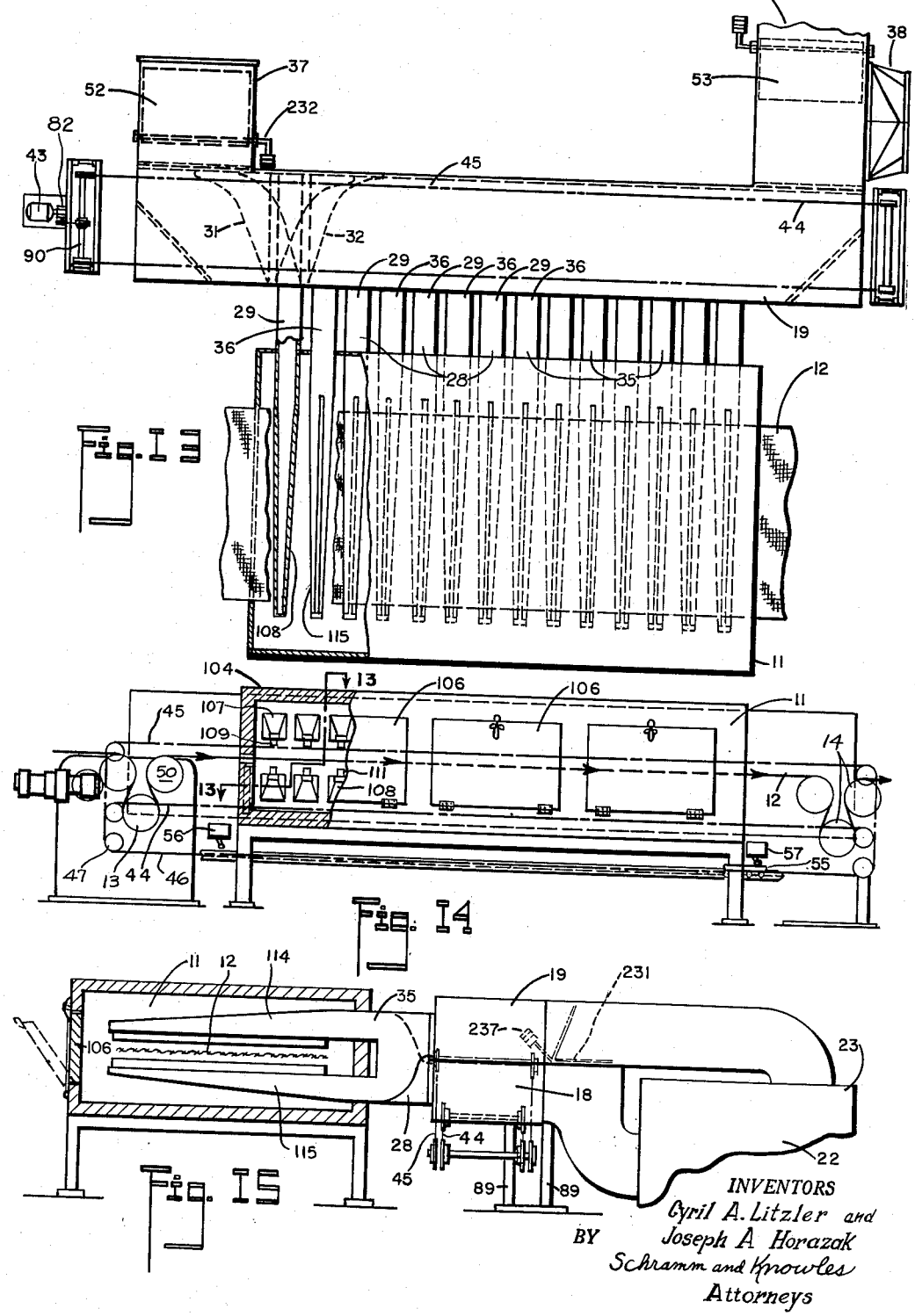

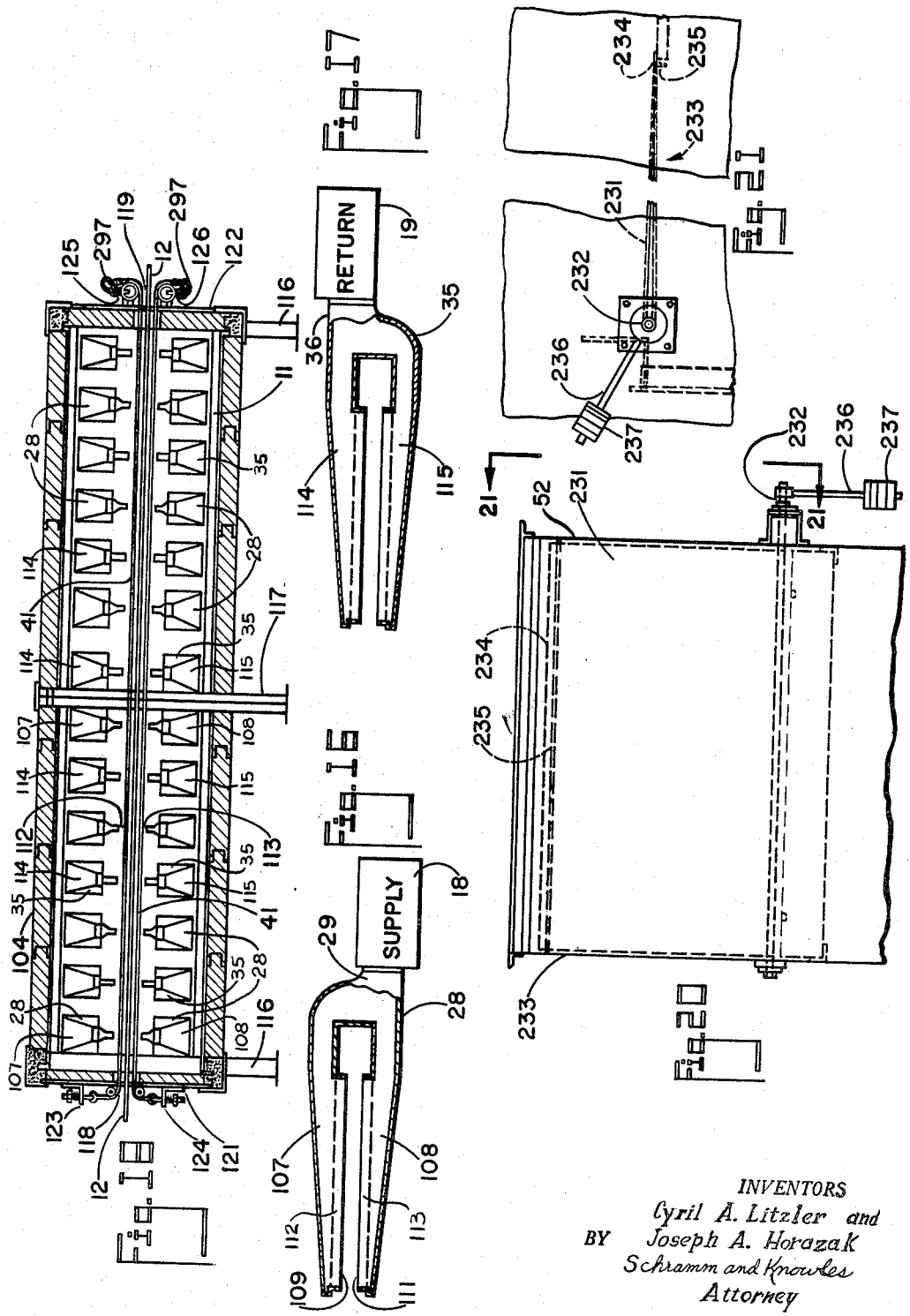

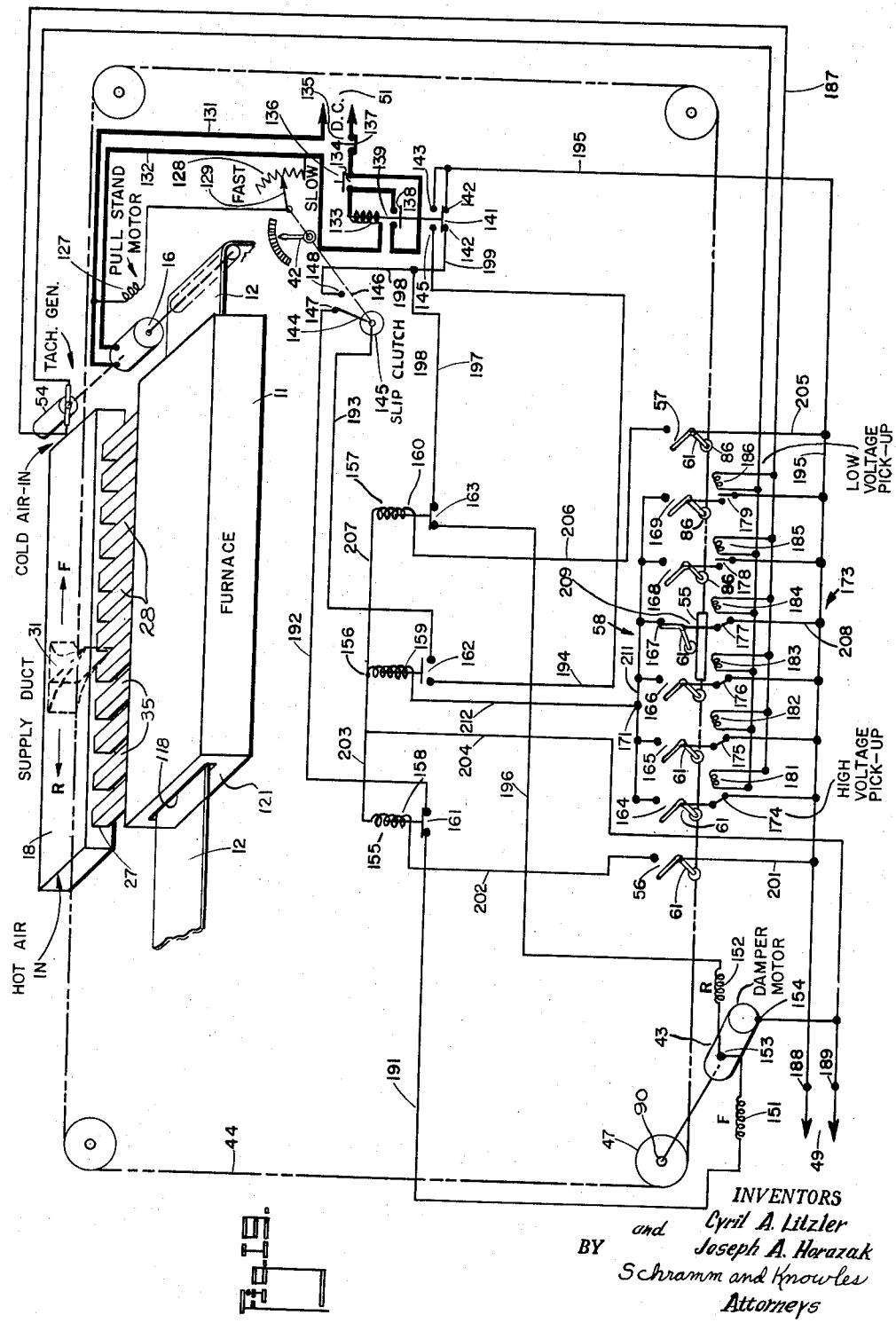

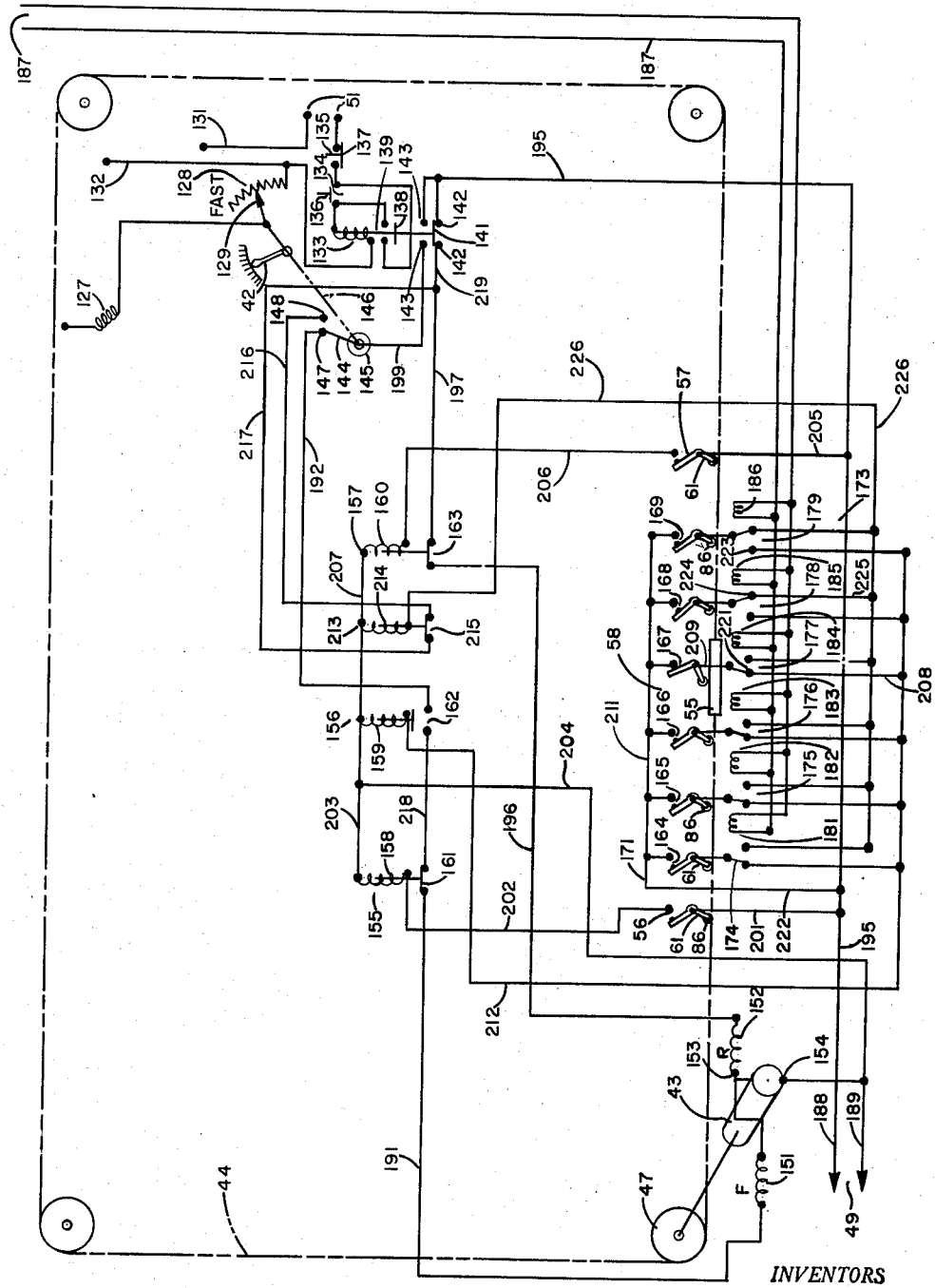

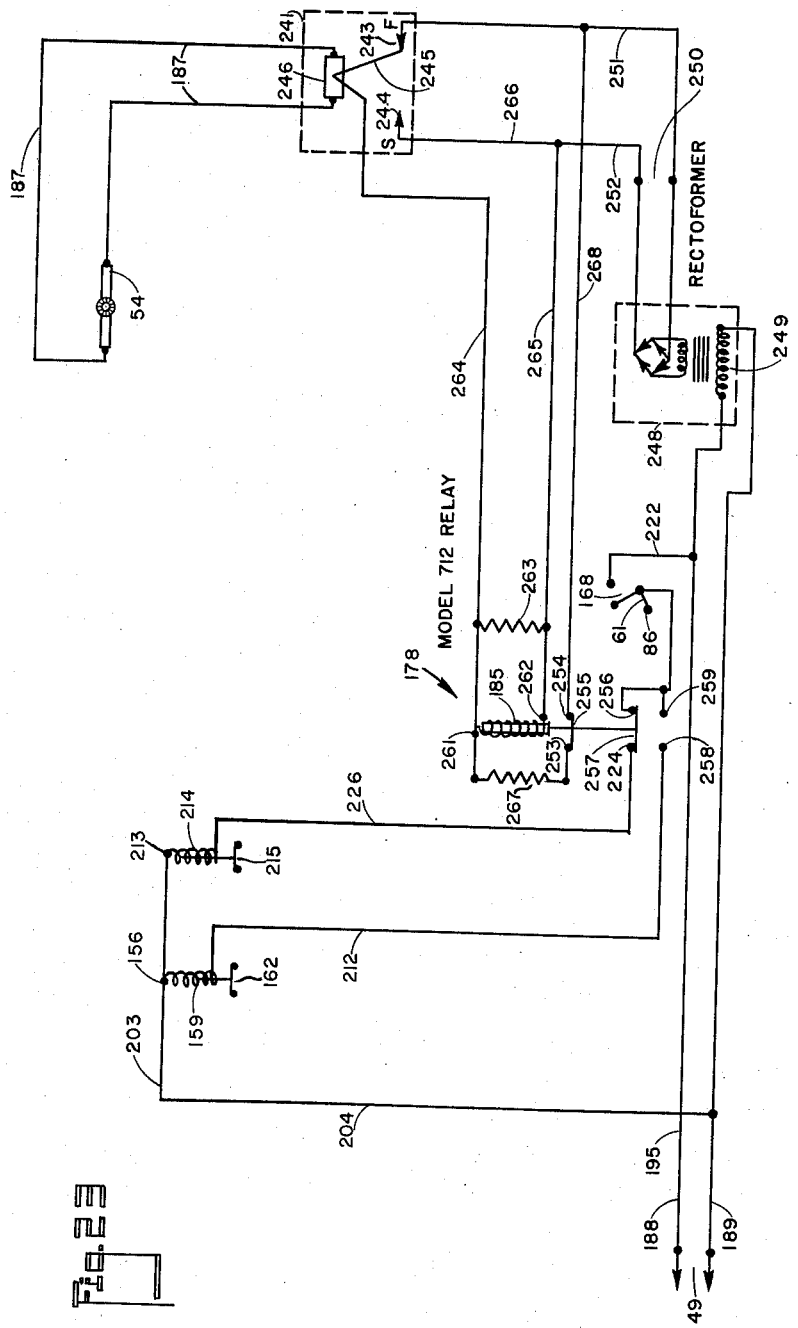

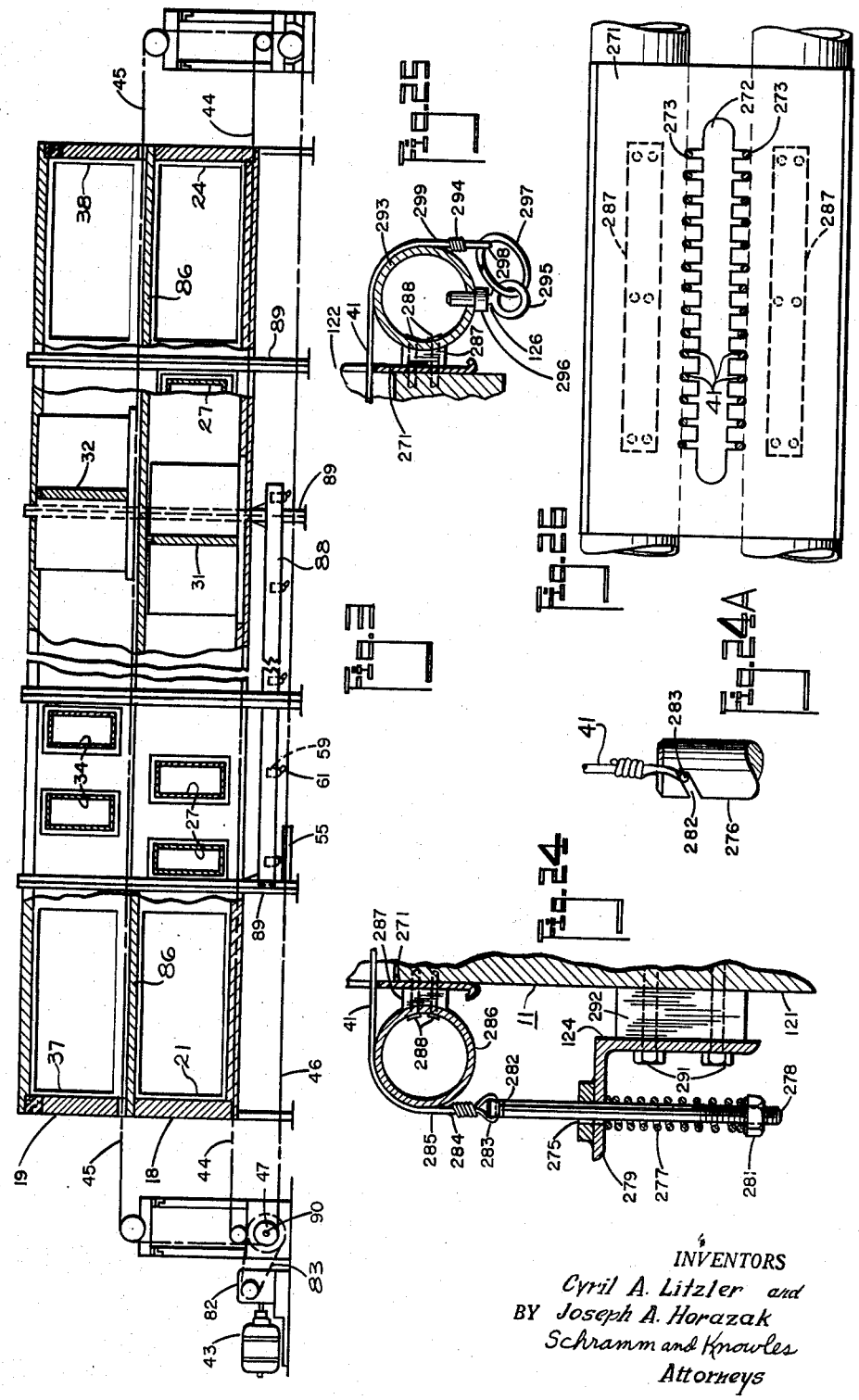

2,955,342
FABRIC TREATING FURNACE HAVING COMMON HOT AND COLD AIR DUCTS AND TRAVELING DAMPERS

Cyril A. Litzler, Lakewood, and Joseph A. Horazak, Fairview Park, Ohio; said Horazak assignor to C. A. Litzler Co., Inc., Cleveland, Ohio, a corporation of Ohio Filed Aug. 8, 1955, Ser. No. 526,937
39 Claims. (Cl. 26—54)

This invention relates to heat-treating and to control of furnaces utilizing a fluid medium for heating or temperature conditioning of material.

Although not limited thereto, the invention is especially applicable to apparatus and processes for hot-stretching textile fabric in the form of a continuously traveling web, particularly a textile fabric having a warp of nylon, polyester resin or the like.

In textile fabrics intended for use in mechanical rubber goods, it is desirable and sometimes necessary to eliminate most or all of the natural extensibility of the warp threads, which in the case of nylon may be as high as 16%. It is known that in the case of threads of synthetic origin, excessive extensibility can usually be eliminated by stretching at super-atmospheric temperatures on or between rolls rotating at different speeds.

It is accordingly an object of the invention to provide apparatus and processes for carrying out such operations on fabrics in which the heating and stretching steps may be controlled to maximum advantage since these are often critical in their effect.

An object is to provide an improved method of heat-treating material, especially in a continuous process such as continuously moving filar, web or sheet material.

Another object of the invention is to provide an improved furnace structure for heat-treating continuously moving filar or sheet material.

Still another object is to attain rapid, reliable, precise and accurate control of temperature of the material being treated as well as adjustment of the heat supply to variations in speed with which the material is caused to travel through the furnace.

Another object of the invention is to supply heat conditioning medium to separate furnace areas and to remove the medium from the same area for recirculation. A general object is to avoid extensive movement of heat-conditioning fluid media within the furnace, especially longitudinally.

An additional object of the invention is to avoid damage to furnace structure or hazard to personnel when treating sheet material under tension, in the event of rupture of the material releasing large amounts of stored potential energy abruptly.

Still another object of the invention is to accomplish control of the temperature and heat supply to a furnace by proportioning the supply of hot and cold fluid media such as air or gas.

A further object of the invention is to accomplish the proportioning of the supply of hot and cold media for temperature conditioning in a double-ended duct supplied with hot and cold media at opposite ends and having intermediate ports communicating with the furnace.

An additional object is to move a damper to effect a suitable proportioning of the hot and cold media according to speed of material through the furnace. Another object generally is to accomplish substantially uniform heating of moving material regardless of the speed thereof.

Still another object of the invention is to provide motor control for damper-positioning means in which attainment of desired position effects stoppage of the motor.

A further object of the invention is to provide for reverse running of a motor to move a damper to the minimum heat position in the event of stoppage of movement of material through the furnace.

Other and further objects, features and advantages of the invention will become apparent as the description proceeds.

In carrying out the invention in accordance with a preferred form thereof in the heat treatment of sheet material such as nylon fabric or tire cord, an elongated furnace or oven is provided, which is associated with a conventional pull stand rolls for drawing the sheet material through the oven under tension.

The general shape of the oven is similar to that described in co-pending application Serial No. 395,157, filed November 30, 1953, entitled Method of and Apparatus for Continuous Tensioning and Treating of a Fabric Web.

In order to obtain rapid and accurate control over the temperature and the amount of heat absorbed by the hot-stretched material moving through the oven, air-supply and exhaust or recirculating nozzles are mounted within the oven structure along the length thereof. Each nozzle is bifurcated and arranged to straddle the path of the sheet material traveling, say, horizontally, through the oven. The nozzles have orifices or vents on the inner surfaces of the legs so that in the case of the supply nozzles, the air is projected against the surfaces of the traveling sheet material, as from both above and below in the case of a horizontally traveling web. Preferably the recirculating nozzles are alternated with the supply nozzles.

Since there are recirculating nozzles between each pair of supply nozzles, the spent air is withdrawn from the furnace after it has been directed against the surfaces of the traveling sheet before it has had an opportunity to travel lengthwise or interfere otherwise with the accurate control of heat supplied to the moving sheet by the control of the temperature and quantity of the air supplied to the furnace.

Preferably, the control of temperature within the furnace and the control of the heat supplied to the moving sheet are accomplished by supplying hot air to the supply nozzles at the entry end of the oven, and supplying cold air beyond those nozzles receiving hot air. The variation in supply of heat to the oven to compensate for variations in speed of the moving sheet material through the oven is accomplished by the adjustment of the proportionate number of nozzles receiving hot and cold air.

For supplying the hot and cold air supply to the oven nozzles, there is a duct running beside the oven along the length thereof, with lateral ports having connections to the nozzles.

Preferably, there are two ducts, besides each other or one above the other. For example, there is a recirculating duct above the supply duct, with the recirculating duct ports connected to the recirculating nozzles and the ports of the supply duct connected to the supply nozzles.

The hot air and the cold air supplied to the supply duct are separately recirculated. A common duct is employed for supplying both the hot and cold air, and a second common duct is employed for recirculating hot and cold air. This is accomplished by providing a damper in each duct.

The dampers extend transversely across the ducts and are movable longitudinally so that they divide each duct into two portions. The position of the damper in the duct then determines the proportion between the number of ports receiving hot and cold air in the case of the supply duct, as well as the number of ports recirculating hot and cold air in the case of the recirculating duct.

The two ends of the supply duct serve as inlets for hot and cold air respectively, and the ends of the recirculating duct serve as outlets for recirculating air streams.

Mechanism is provided for moving the two dampers in unison and maintaining a fixed spacing between the dampers, preferably that between a recirculating nozzle and an adjacent duct supply nozzle, so that for any position of the supply duct damper, midway between supply ports, the recirculating duct damper will also be positioned between a pair of recirculating duct ports. An uninterrupted passage for hot air will thus be provided from the last nozzle receiving hot air to an adjacent nozzle returning the air through a recirculating port. A similar relationship will exist for the recirculation of cold air.

For effecting the longitudinal movement of the dampers within the ducts, endless chains are provided, which are connected to the dampers and run lengthwise through the ducts. The two chains are connected externally and driven through sprockets by a suitable reversible motor.

A shoe trip bar or contact plate is connected with the portion of the chains traveling externally of the ducts, and end limit switches are provided for cooperating with the shoe to stop the damper driving motor when the shoe has reached the limit of travel corresponding with the end positions of the dampers within the ducts. Between the two end limit switches, other position responsive switches are provided. These are preferably substantially evenly spaced and arranged to be actuated in succession, as the contact shoe is moved along in one direction or the other in the course of the running of the motor to move the dampers in one direction or the other, in the ducts.

It will be understood that suitable driving means, preferably an electric motor driving pull stand rolls is provided for causing the sheet material to travel through the furnace. Rolls at each end maintain the material under tension.

Mechanism is provided responsive to linear speed of the material through the furnace or to the speed with which it is caused to travel therethrough such as a speed responsive device for the pull stand motor, for example. This may take the form of a tachometer generator, directly or indirectly driven from the shaft of the pull stand motor, or one of the rolls over which the material is passed.

Speed responsive switches are provided, one associated with each of the position responsive switches, cooperating with the contact shoe associated with the damper driving motor.

The arrangement is such that when any one of the speed responsive switches is closed in conjunction with an associated position responsive switch or, vice versa, the damper-driving motor circuit will be de-energized to bring the dampers to a stop within the ducts. Thus the position thereof is in proportion to or depends upon the speed of movement of the material through the furnace. For rendering the speed responsive switches responsive to the voltage of the tachometer generator, a plurality of contact-making voltmeters may be provided. There are designed or adjusted for different voltages corresponding to successively higher speeds. The contact elements of such contact-making voltmeters then serve as the speed responsive switches which cooperate with the position-responsive switches.

Preferably, inter-locks are provided to prevent the operation of the damper motor until the main drive or pull-stand motor is energized for causing the material to move through the oven. A "fail-safe" interlock is also provided to cause the damper motor to run in the reverse direction and carry the damper to the position in which hot air is cut off and only cold air is supplied in the case of interruption of the circuit of the main driving motor. To this end, separate electrical current supplies are provided for the main driving motor, and the damper motor.

In addition the control is arranged to cause the damper to move in the direction of increasing heat when the speed of travel of the sheet through the oven is increased and vice versa. For this purpose directional switches for the damper motor are arranged on the speed control lever of the main drive motor so that when the speed control lever is moved in the direction of increasing speed, the forward switch is closed in the damper control circuit, and when the control lever is moved in the opposite direction, the reverse switch in the damper motor circuit is closed.

A better understanding of the invention will be afforded by the following detailed description considered in conjunction with the accompanying drawings in which:

Fig. 1 is a distorted, partially rearranged, simplified, schematic diagram of a heat treating and furnace control system forming an embodiment of the invention.

Fig. 2 is a plan view of an embodiment of the invention illustrating the arrangement of hot and cold air supply ducts.

Fig. 3 is an elevation of the portion of the apparatus illustrated in Fig. 2 with portions broken away to expose a cross section represented as cut by a broken vertical plane, 3—3 in Fig. 2.

Fig. 4 is a detail view of the construction of the damper for use in the apparatus of Fig. 1, showing a cross-section represented as cut by a horizontal plane.

Fig. 5 is a view of the apparatus of Fig. 4 showing a cross-section represented as cut by a vertical plane.

Fig. 6 is a cross-sectional view of the track angle construction for support of the movable damper represented as cut by a plane 6—6 indicated in Fig. 5.

Fig. 7 is a fragmentary enlarged view of a portion of Fig. 4 illustrating the connection of the driving chains for the damper.

Fig. 7A is a fragmentary enlarged view of the portion of the apparatus of Fig. 4 shown on Fig. 7, but represented as cut by a vertical plane 7A—7A represented in Fig. 7.

Fig. 8 is a fragmentary enlarged cross-sectional view of a portion of Fig. 4 illustrating the sealing arrangement of the dampers.

Fig. 9 is a cross-sectional view of one of the ducts illustrated in Figs. 1 to 3 represented as cut by a plane 9—9 indicated in Fig. 4.

Fig. 10 is a fragmentary enlarged view of apparatus of Fig. 2 presenting a side view of the arrangement of position switches and the actuating trip bar for controlling movement of the damper of Figs. 1 to 5 and 9, as seen from the front or oven side, and partially in cross-section as cut by a plane 10—10 indicated in Fig. 11.

Fig. 11 is a cross-sectional view of the apparatus of Fig. 10 represented as cut by a plane 11—11 and seen from the end.

Fig. 12 is a perspective view of the position switch arrangement of Figs. 10 and 11, as seen from the back.

Fig. 13 is a plan view of an oven employing the air supply duct construction of Figs. 1 to 3.

Fig. 14 is an elevation of the apparatus of Fig. 13.

Fig. 15 is an end view partially in cross-section of the apparatus of Figs. 13 and 14.

Figs. 16 and 17 are detail views of the bifurcated supply and recirculating nozzles respectively of Figs. 1 and 3, 13 to 15.

Fig. 18 is a sectional view of the apparatus of Figs. 13 to 15, represented as cut by a vertical plane.

Fig. 19 is an electric circuit diagram, and partially a schematic diagram, of the system for actuating the damper employed in the apparatus and controlling it according to speed of material through the oven.

Fig. 20 is a detail view of the by-pass or relief damper arrangement for use in the apparatus of Figs. 1 to 19.

Fig. 21 is a fragmentary elevation of a portion of the apparatus of Fig. 20, showing the by-pass damper, and Figs. 22 and 23 are fragmentary circuit diagrams illustrating modifications in the arrangement of Fig. 19.

Fig. 24 is an enlarged detail view partially in cross-section of a portion of the apparatus of Fig. 18 showing the support for guard wires at the entry end of the oven.

Fig. 24A is a fragmentary enlarged view of a portion of Fig. 24.

Fig. 25 is a view corresponding to Fig. 24 showing guard wire support at the exit end of the oven.

Fig. 26 is a view of a closure plate for the oven.

Like reference characters are utilized throughout the drawings to designate like parts.

As illustrated, an oven 11 (represented fragmentarily in Fig. 1) is provided for heat treating continuously moving material such as strip 12 composed of a substance such as nylon fabric or tire cord, for example. The strip 12 is passed through the oven 11 by suitable motor driven means. Although the invention is not limited to heat treatment or temperature conditioning of stretchable material it has been illustrated for use in a system for treating material such as nylon fabric which is to be heat treated while under tension. The requisite tension or degree of elongation from one set of pull stand rolls 13 to a second set 14 is maintained under control of the pull stand motors 15 and 16, respectively. Suitable control mechanism is provided for regulating the relative speeds of the motors 15 and 16, or the relative torques, so that a fixed percentage of elongation of the strip 12 takes place within the oven 11, or a predetermined tension is maintained, according to the desired system of treating the strip 12.

For adjusting the speed with which the material 12 passes through the oven or furnace 11, and regulating heating and cooling thereof in accordance with the invention, an electrical control panel 17 is provided, including control mechanism, shown in Fig. 19, to be described in greater detail hereinafter. Heating, controlling temperature and tempering or cooling of the strip 12 are obtained by a fluid, preferably gaseous, heating medium supplied to the oven 11 through a duct 18 from one end, and a fluid, preferably gaseous, cooling medium supplied to the oven through the duct 18 from the opposite end. A recirculating or return duct 19 is also provided, connected to circulating fans or blowers.

The duct 18 is connected at one end with a source of heating medium such as a hot-air pipe 21, for example, and at the other end with a cooling medium source such as a cool or cold air pipe 24. The hot air is produced by an electric heater 22, by a gas, oil or coal burning furnace, or other source of heat in or associated with the pipe 21, which is connected to a blower 23 for causing flow of the heating medium such as air through the duct 18. A cool air pipe 24 is connected to a suitable source such as a cool air inlet 25 with a blower 26 interposed for drawing atmospheric air into the system.

For the sake of simplicity no arrangement is illustrated for withdrawing from the circulating system moisture that is picked up by the heated air in passing over the traveling web 12. Preferably, however, a fraction of the air in the hot circuit is continuously exhausted to atmosphere for withdrawing moisture. The fraction to be withdrawn depends upon the particular equipment and conditions of operation. For example, ten percent of such air may be withdrawn. The invention accordingly, does not exclude the provision of a branch duct connected to the recirculating duct 37 and serviced by an auxiliary blower or exhaust fan for withdrawing a fraction of the air.

To compensate for the air withdrawn by such an auxiliary blower, a grill or other inlet is provided at or in advance of the heater 22 so that atmospheric air can be drawn into the hot system continuously. No control is required for the operation of such an auxiliary blower since it may be designed initially for the particular equipment to operate continuously and effect the desired fraction of change in circulated air.

A plurality of ports 27 are provided in the side of the duct 18 toward the oven 11, each connected to a bifurcated nozzle 28 by a throat 29 and extending into the oven housing 11. As will be illustrated more clearly in other figures, the nozzles 28 have vents or orifices for directing the heating medium against the upper and lower surfaces of the moving strip 12. A damper 31 adapted to be moved longitudinally in the duct 18 is provided for separating the duct 18 into two parts, one of which receives the heating medium from the hot-air pipe 21 and the other of which receives the cooling medium from the pipe 24 so that all the nozzles 28 to the left of the damper 31 are supplied with heating medium and all of the nozzles such as the nozzle 28a, for example, to the right of the damper 31 receive cooling medium, in this case cooling air, which for the present purpose may be air at room temperature.

For promptly exhausting the temperature conditioning medium, namely the heating air and the cool air, in the illustrative embodiment, from the portions of the oven 11 where the temperature conditioning medium is injected, the second duct 19 is provided, which may parallel the duct 18, in this case being supported directly upon the duct 18. The duct 19 likewise has a damper 32 and plurality of ports 34, each connected by means of a throat 36 to a bifurcated nozzle 35 similar to the nozzles 28 and likewise having vents for receiving the temperature conditioning medium and exhausting it through the duct 19. To this end suitable connections are provided. For example, an exhaust pipe 37 may connect the heated-air end of the return duct 19 to the intake of the blower 23. Likewise, if desired, an exhaust pipe 38 may connect the cool-air end of the return duct 19 to the intake 25 of the blower 26. Alternatively, a separate exhaust blower 39 may be provided.

The strip 12 travels under tension and stores a large amount of potential energy which may be released abruptly with disruptive force in the event of rupture or damage to the strip 12. Accordingly, in order to protect nozzles 28 and 35, the oven 11 and other parts of the structure not shown in Fig. 1, a network or grating of guard wires 41, shown fragmentarily in Fig. 1, is preferably provided above and below the path of the sheet 12. The guard wires 41 are provided, however, mainly as a safety measure and means are provided to prevent excessive heating of the strip 12, or other heating damage. The control of the heating is accomplished by the setting of the damper 31 in the duct 18 so as to proportion the number of nozzles 28 supplying heating medium and the number of nozzles 28a supplying cooling medium.

The amount of heat absorbed by the strip 12 and, therefore, the temperature thereof varies with the speed with which the strip 12 is passed through the oven. The arrangement is, therefore, such that setting of the damper 31 is adjusted in accordance with the speed with which the strip 12 passes through the oven 11. The control panel 17 is provided with a speed control handle 42 fitted with a mechanism for initiating the movement of the damper 31. A damper drive motor 43 is provided for moving both dampers 31 and 32. The connections are such that uniform spacing is maintained between the dampers 31 and 32 such as the spacing between successive nozzles 28 and 35, so that the nozzles exhausting the temperature conditioning medium from the oven 11 will be divided in the same manner as the nozzles supplying temperature conditioning medium. Thus, the nozzle 35 to the left of the damper 32 will exhaust heated air supplied by the nozzles 28 to the left of the damper 31. Likewise the nozzles 35a to the right of the damper 32 will exhaust cool air which has been injected by the nozzles 28a at the right of the damper 31.

As represented schematically in Fig. 1 the damper driving motor 43 is mechanically connected to the dampers 31 and 32 by chains 44 and 45 which follow paths in a common plane 46 around sprockets 47 carried on a shaft 48 of the damper driving motor 43. The latter is a reversible motor energized by a separate source of current independent from that energizing the pull stand motors 15 and 16. For example, as indicated schematically in Fig. 1, there may be an alternating-current source 49 supplying the reversible damper-driving motor 43 through the control mechanism on the panel 17, and a direct-current source 51 for supplying the power for the motors 15 and 16 through other control mechanism (not shown) on the control panel 17. For simplicity, the electrical connections are omitted in Fig. 1.

Relief dampers or by-pass dampers 52 and 53 may be provided for relieving the pressure of the heating or cooling medium in the event of the dampers 31 and 32 being positioned so far at one end or the other of the ducts 18 and 19 as to cut off the egress of the medium through the nozzle throats 27.

The position of the dampers 31 and 32 is made dependent upon the speed of the strip 12 through the oven 11, thereby adjusting the heating in accordance with the variations in speed. For this purpose, speed responsive mechanism is included in the control panel 17, actuated in accordance with a voltage proportional to the strip speed. Such a speed responsive voltage may be provided by a tachometer generator 54 or 54" connected to the shaft of one of the pull stand motors 15 or 16 or alternatively to one of the rolls such as the roll 50 over which the moving strip 12 passes, in which case, the tachometer generator occupies the position 54'.

The chains 44 and 45 for driving the dampers 31 and 32 are connected to a trip bar 55 adapted to cooperate with end-limit switches 56 and 57 for stopping the damper driving motor 43 when the dampers 31 and 32 reach end positions in the ducts 18 and 19 toward the output or input ends of the oven 11 respectively. There is likewise a position switch assembly 58 including a plurality of position switches 59 with depending trip levers 61 adapted to cooperate with the trip bar 55 for stopping the damper drive motor 43 when the dampers 31 and 32 have been driven to the appropriate position for the speed of movement of the strip 12. The mechanism will be discussed in greater detail in connection with the description of the circuit diagram Fig. 19. A bettter understanding of the actuation of the dampers and the relationship of the dampers to the ducts is provided in the plan and elevation views of Figs. 2 and 3 respectively.

The ducts 18 and 19 may be of a suitable construction such as sheet metal work with the throats 29 and 36 for nozzles 28 and 35 being fitted in the sides thereof at the ports 27 and 34. The ducts 18 and 19 make lateral connection with the hot air pipe 21 and the hot air return pipe 37 at one end; at the other end with the cool air pipe 24 and the exhaust pipe 38. The ports 27 and 34 are on the side of the ducts toward the oven 11.

The dampers 31 and 32 are provided with suitable low friction support means and bracing means to maintain them in transverse relationship to the ducts 18 and 19. For example, as shown in Fig. 4, the damper 32 is provided with curved baffles and angle iron braces 62 secured at one end by screws or bolts 63 to the transverse damper plate 32 and curved back in portions 64 secured at the lower ends to the horizontal bar 65 adapted to be secured to the chain 45. In actual practice as shown in Figs. 2, 3 and 11 the chains 44 and 45 are actually pairs of chains secured to similar bars 65 and 66 riding in the lower corners of the ducts and supporting the damper plate 31 or 32. The bars 65 and 66 are secured to the damper plates 31 and 32 in any suitable manner as by means of flanges 67 and 68 bolted or screwed to the damper plate 31 or 32 for greater rigidity of the assembly. A carriage for the damper 31 or 32 is formed by joining the ends of the bars 65 and 66 by means of rods 69 welded or otherwise secured at their ends to the bars 65 and 66. Moreover, to avoid friction, the carriage consisting of the parts 65, 66 and 69 is provided with rollers 71 mounted in blocks 72 secured to the bars 65 and 66.

Track angles 73 are mounted in the ducts 18 and 19 for supporting the rollers 71 as shown in Fig. 6.

The manner of joining the rod 69 to the bar 66 by welding is shown in greater detail in Fig. 7. There is a stub 74 as shown more clearly in Fig. 7a also welded to the bar 66 and having a section 75 of reduced thickness. The latter has a link-pin receiving opening 76 for making connection with the chain 45 by means of a chain link pin 77 as shown in Fig. 4. Suitable means are provided for flexible sealing of the edges of the damper plate 31 or 32 within the duct 18 or 19. For example, as shown in Fig. 8, multiply flexible seals 78 may be secured to flanged ends 79 of the damper plate 31 or 32 by means of machine screws 81. The seal 78 may be composed of heat resistant material such as asbestos sheets. The damper plates 31 and 32 may comprise thin metal sheets 30, enclosing insulating block material 80 of asbestos or the like confined at the ends by metal channel 87. For simplicity the damper drive motor 43 is represented in Fig. 1 as directly connected to the chain driving sprockets 47 and the shaft 48. It will be understood, however, that if desired as shown in Figs. 2 and 3 a reducing gear 82, and an intermediate chain drive 83 may be interposed with four separate sprockets 47 carried on a counter shaft 90 driven by the intermediate chain 83, for driving the damper chains 44 and 45.

The preferred form of the trip bar 55 is shown more clearly in Figs. 10, 11, and 12. The trip bar 55 is preferably provided with rollers 84 adapted to ride on the web of a channel track 85 serving as a partial enclosure also for the links of the chains 44 and 45.

The position switch assembly 58 preferably takes the form as shown in Figs. 10, 11 and 12 of an angle beam 88 on which separate position switches 59 are mounted, each having a trip lever 61 carrying a roller 86 adapted to cooperate with the trip bar 55 to deflect the lever 61 when the trip bar 55 moves under the position switch in question. The position switches 59 may be of conventional commercial form such as utilized as limit switches and the limit switches 56 and 57 may be of similar form with similar depending trip levers 61.

The beam 88 supporting the position switch assembly 58 is mounted below one of the track angles 73 for supporting the dampers 31 and 32 so that the chains 44 and 45 attached to the dampers 31 and 32, respectively, will be in alignment with the ends of these chains secured to the trip bar 55 as illustrated in Figs. 2 and 11. The chains 44 for moving the damper 31 are positioned slightly closer together than the chains 45 for positioning the damper 32 so that the two chains 44 and 45 may travel along common horizontal plane 46 preferably riding in the channel iron 85.

As illustrated in Figs. 3 and 15 a twin duct structure is employed with the supply duct 18 supporting the re-circulating duct 19 and forming a unitary structure supported by uprights 89. As illustrated in greater detail in Fig. 9, the re-circulating duct 19 comprises a sheet 92 of sheet metal or the like bent into channel form to provide the upper and side walls of the duct 19 and secured at flanges 93 to the angle girders 73, inwardly turned to serve as track angles for the damper supporting carriages 65 and 66 illustrated in Fig. 4.

The carriages are only partially visible in Fig. 9 which represents a cross section through the structure of Fig. 4 as cut by a vertical plane 9—9, along a surface of the plate 32, so as to show a section of the side bars 65 and 66 of the carriage and the flanges 67 and 68 resting on the bars 65 and 66 and secured to the damper plate 32. The flexible seals 78 shown in greater detail in Fig. 8 extend around the edges of the damper plates 31 and 32 so as to meet substantially the surfaces of the sheet metal 92.

The lower wall of the duct 19 is composed of a sheet 95 secured to the track angles 73 and resting upon an insulating plate 96 which in turn rests upon a sheet 97 similar to the sheet 95 forming the top surface or wall of the supply duct 18. The remaining walls of the duct 18 are composed of a bent sheet member 98 similar in shape and area to the sheet 92 but inverted with respect thereto. For enclosing the insulating plate 96 and joining the sheets 95 and 97, channel strips 99 are provided. It will be understood that in the lower corners of the supply duct 18 similar track angles 73 are provided, as illustrated in Fig. 11, for both reinforcing the lower corners of the duct 18 and supporting the carriage for the supply duct damper 31 as well as protecting the sheet 98 from the abrasion of the chain 44. The angle girder 88 supporting the position switches 59 may be secured to the uprights 89 but is preferably secured to a separate dependent strut or hanger 101 secured by welding or otherwise joining to a girder 102 joined to the uprights 89 for supporting the duct structure. A similar angle girder 103 may be secured to the uprights 89 for supporting the channel 85 supporting the chains 44 and 45 and the trip bar 55.

The relation between the oven 11 and duct structure 18, and 19 is illustrated in the plan view of Fig. 13 whereein the nozzles 28 and 35 are represented within the oven 11 by hidden lines only, the throat portions 29 and 36 being actually visible in Fig. 13. It will be understood that if desired a greater number of nozzles may be employed than actually shown in Fig. 13 in which the structure has been contracted longitudinally to simplify the drawing. Moreover, in the schematic diagram of Fig. 1 the nozzle spacing has been exaggerated for clarity, so that the full number of nozzles could not be shown.

As illustrated in Fig. 14, the oven 11 is preferably constructed with refractory walls 104 composed of suitable heat resistant insulating material. Access doors 106, hinged at the bottom, are preferably provided to permit workmen to enter the oven 11 when necessary, the grating or protective bar structure 41 (Fig. 18) serving for the support of workmen when entering the oven 11.

The preferred structure of the bifurcated nozzles or "pants" 28 and 35 is shown in Figs. 15, 16 and 17. The supply nozzle 28 comprises the hollow throat 29 from which extend upper and lower hollow legs 107 and 108 respectively. In the spaced parallel confronting walls of the legs 107 and 108 which face toward each other, elongated orifices are provided for directing streams of heating medium against the upper and lower surface respectively of the strip material 12. If desired these walls may be formed with projecting, spaced parallel fins 109 and 111 so as to form two elongated narrow orifices 112 and 113, above and below the strip material 12. It will be observed that in the case of the supply nozzle 28, the lower leg 108 extends horizontally and transversely from the supply duct 18 substantially at the same level, whereas the portion of the throat 29 to which the leg 107 is joined, curves upward, whereby the upper leg 107 is substantially at the level of the return duct 19. In the case of the return nozzle 35, the lower leg 115 joins a downward curved portion of the throat 36 so as to come substantially at the level of the supply duct 18. In this manner the upper and lower legs of the successive alternating supply and return nozzles are in alignment as indicated in Fig. 15 and in Figs. 1, 14, and 18.

Figure 18 illustrates in greater detail the structure of the oven 11, having both end uprights 116 and intermediate uprights 117 for support and with openings 118 and 119 for entry and exit, respectively of strip 12. The safety guard wires or grating 41 are secured to supports or bracket members 123 and 124 mounted adjacent the entry end wall 121 and to supports 125 and 126 adjacent the exit end wall 122.

In Fig. 19 the mechanical structure is represented schematically in order to simplify the representation of electrical circuit connections; only the supply duct 18 is represented since the return duct damper 32 is mechanically connected to the damper 31 through the chains 44 and 45 and motion thereof is produced by the same damper motor 43. For simplicity, only one of the pull stand motors, namely, the motor 16 for the pull out roll 14 is shown in Fig. 19. The speed control for the pull stand motor 15 of Fig. 1 may be accomplished in any desired conventional manner as by means of dancer arms so as to maintain either a fixed relationship of speed to the pull out motor 16, or a fixed tension of the strip 12, according to the type of operation desired. Preferably separate and independent current supply sources 49 and 51 are employed for the damper motor 43 and the pull stand motor 16 or motors 15 and 16. For the sake of illustration, the pull stand motor 16 is shown as being of the direct-current type since fine speed control may most readily be accomplished in a direct-current motor, and accordingly the source 51 is a direct-current source. The speed control for the motor 16 is represented as being accomplished by means of control of the field current. There is a shunt field winding 127 connected to the current source 51 through a field rheostat 128 having a movable tap 129 mechanically connected to the speed control handle 42. The electrical circuit for the power for the motor 16 can be traced from the input terminals 51 through the conductor 131, the armature of the motor 16 to the conductor 132, a holding relay coil 133, a pair of normally-open contacts 134, a pair of normally closed contacts 135 back to the direct-current terminals 51. The shunt circuit for the field winding 127 may be traced from the conductor 131, through the winding 127, the rheostat and back to the conductor 132, so that the field winding 127 will be energized whenever the armature of motor 16 is energized.

For starting the motor 16 a push button contact 136 is provided to bridge the normally open contacts 134. For stopping the motor 16 and shutting down the operation, push button contact 137 is provided adapted to break the circuit at the normally closed contacts 135. In order to maintain the flow of current through the pull stand motor 16 after it has been started by depressing the push-button 136, normally open contacts 138 are provided, which are mechanically connected to an armature or plunger 139 adapted to be lifted by the holding relay coil 133, when current is passed through by depressing the push button contact 136. The plunger 139 also has connected thereto a movable contact 141 adapted to rest upon the pair of stationary contacts 142 when the coil 133 is not energized, and to bridge a pair of stationary contacts 143, when the coil 133 is energized and the plunger 139 is lifted.

To the same shaft 146 carrying the pull-stand motor speed-control arm 42 and the field rheostat tap 129, is mechanically connected a directional relay contact arm 144 with a slip clutch 145 interposed between the schematically represented shaft 146 and the contact arm 144, so that the contact arm 144 may be caused to make electrical contact with one or the other of a pair of stationary contacts 147 or 148 according to the direction in which the speed control arm 42 is moved.

The damper motor 43 is illustrated as being of the double winding type, for example an alternating current motor. For convenience in explanation and by way of illustration it is represented as having a single armature and a pair of oppositely wound field windings 151 and 152 so that the direction of rotation of the motor 43 may be controlled by causing current to flow through one or the other of two windings 151 or 152, in accordance with the direction of movement of the pull-stand motor speed control handle 42. For simplicity of illustration a series wound type of motor is represented.

Although a double-field or double winding alternating-current damper drive motor system has been described by way of explanation of the motor 43, it is to be understood that the invention does not exclude the use of a standard motor with a reversing starter, which would provide greater simplicity in actual installation and operation since special high torque is not required. Other types of motors such as repulsion motors or other high-torque motors may also be employed; but standard three-phase induction motors have been found adequate for bringing the dampers and driving chains of the illustrated structure into motion quickly. In the circuit arrangement illustrated the windings 151 and 152 are represented as having a common terminal 153 serving as one armature terminal of the motor 43. The other armature terminal is represented at 154.

For bringing the motor 43 to a stop when the desired damper position has been obtained or when the dampers have traveled to either end of the ducts, control relays 155, 156 and 157 are provided having windings 158, 159 and 160, actuating normally closed contacts 161, 162 and 163 respectively. The limit switches 56 and 57, as shown in Fig. 19, are normally open switches with trip levers 61 adapted to be engaged by the trip bar 55 for closing the switch contacts 56 or 57 when the trip bar 55 reaches either limit of travel corresponding to the limit of travel of the dampers 31 and 32.

The bank of position switches 58 includes a plurality of switches, of any desired number, according to the precision of control desired. For the sake of illustration, six normally open switches 164, 165, 166, 167, 168, and 169 are provided having a common terminal 171 and each having a trip lever 61 adapted to close the switch in question when the trip bar 55 passes under it as illustrated by the closure of the switch 167. The swiches 164 to 169, inclusive, are preferably mounted in housings such as illustrated in connection with the switch assembly 59 shown in Figs. 10 and 11. In series with the bank of position switches 58 there is a bank of speed-responsive switches 173 comprising a plurality of normally-closed switches equal in number to the number of position switches in the bank 58. As illustrated the speed-responsive switch-bank 173, comprises switches 174, 175, 176, 177, 178 and 179. The switches 174 to 179 are so constructed so as to become responsive to progressively greater speeds of the strip 12. Preferably this is accomplished by providing a speed-responsive voltage generator such as the tachometer generator 54 and making the switches 174 to 179 in the form of contact-making volt meters, each set for a progressively higher magnitude of voltage. Accordingly, the switches 174 to 179, inclusive, include voltage responsive windings 181, 182, 183, 184, 185 and 186, respectively, all connected in shunt and connected by means of a pair of conductors 187 to the tachometer generator 54.

For connection to the alternating-current source 49 there is a pair of terminals 188 and 189. A forward running circuit for the damper motor 43 is provided from the alternating-current terminal 189, the terminal 154 through the armature of the motor 43 to the terminal 153, through the forward field winding 151, a conductor 191, normally closed contacts 161 of the forward limit switch relay 155, a conductor 192, the forward contact 147 of the directional switch on the shaft of the pull stand motor speed control handle 42, the movable directional contact 144, a conductor 193, normally-closed contacts 162, a conductor 194, the normally open contacts 143, (but which are closed when the motor 16 is running), and a conductor 195 back to the terminal 188 of the alternating-current source 49.

On the other hand, a reverse running circuit for the damper motor 43 is provided from the terminal 189 to the armature terminal 154, the motor armature, the field junction 153, the reverse field winding 152, a conductor 196, the normally-closed contacts 163 of the reverse limit switch relay 157, conductors 197, and 198, reverse drive contact 148 of the directional switch 144, mechanically connected to the speed control arm 42, and the conductor 193 through the circuit previously traced, including normally closed contacts 162, conductor 194, contacts 143, conductor 195, back to terminal 188.

When the pull stand motor 16 is de-energized with no current flowing through the coil 133, so that movable contact 141 drops across the stationary contacts 142, an alternative reverse running circuit or fail-safe circuit is provided. This serves for restoring the damper 31 to the lefthand end of the duct 18 in which all of the nozzles are cut off from the heated air so as to avoid overheating the strip 12 in case the motor 16 should come to stand still. The alternative or fail-safe reverse running circuit takes place from the terminal 189 to the armature terminal 154 through the armature, junction terminal 153, reverse field winding 152, conductor 196, closed contacts 163, conductors 197 and 199, the normally closed contacts 141 and 142, conductor 195 back to the terminal 188 of the alternating-current source 49.

In case the dampers 31 and 32 should be driven to the limit of their forward direction, the trip bar 55 lifts the lever 61 of the forward limit switch 56 thereby closing the switch 56 and forming a circuit from the alternating-current terminal 188 through conductor 201, through the switch 56 which is then closed, a conductor 202, the winding 158 of the relay 155, a conductor 203, a conductor 204 back to the remaining alternating-current terminal 189. Energization of the winding 158 opens the normally closed contacts 161 thereby breaking the forward-running circuit of the motor 43 between the conductors 191 and 192 and bringing the motor 43 to a stop. On the other hand in the event that the dampers 31 and 32 should be driven to the limit of their motion in the reverse direction, the trip bar 55 comes under the trip lever 61 of the reverse limit switch 57, closing the switch contacts and forming a circuit through the winding 160 of the reverse limit switch relay 157. This serves to open contacts 163 and break the reverse circuit of the motor 43 through the winding 152 between the conductors 196 and 197. A circuit through the winding 160 takes place from the terminal 188 through the conductor 195, the conductor 205, the switch 57, which is then closed, the conductor 206, the winding 160, conductor 207, the conductor 204, to the second alternating terminal 189.

As the trip bar 55 travels in one direction or the other it passes under the trip levers 61 of one or more of the position switches 164 to 169 inclusive. For example, if the trip bar 55 moves forward (to the left) to the position illustrated in Fig. 19, the position switch 167 is closed. If then the speed of strip 12 is such that the corresponding voltage-responsive switch 177 remains de-energized, a circuit is formed through the position-switch relay winding 159. Such a circuit may be traced from the terminal 188 through conductor 195, conductor 208, the normally closed contacts 177 of the voltage responsive coil 184 assumed to be de-energized, conductor 209, the switch 167 which has been closed, conductors 211 and 212, the winding 159 of the position switch relay 156, the conductor 204 back to the alternating-current terminal 189. Thus, if any associated pair of switches in the switch banks 58 and 173 should be closed, the relay 156 is energized to open the normally closed contacts 162 and break the circuit to the motor 43 between the conductors 193 and 194 if the pull stand motor 16 is running and the contacts 142 are open.

The manner in which the dampers 31 and 32 are positioned in accordance with required heating of the strip 12 for the purpose of heat treatment and quenching, therefore in accordance with speed of travel, is a follows: As soon as the motor 16 is started by depressing the starting button 136, the handle 42 is moved toward the left so as to move the field rheostat tap 129 from the full field position at the "slow" end of the rheostat 129, causing the directional switch blade 144 to move against the contact 147. This closes the forward circuit through the forward field winding 151 of the motor 43 previously described and starts the motor 43, which thereupon moves the dampers 31 and 32 in the forward direction indicated by the arrow F on the duct 18 into positions to open progressively more of the ports 27 so as to increase the supply of heating medium to the furnace 11.

At the same time, as the motor 16 speeds up, speed of rotation of the tachometer generator 54 increases, causing the voltage to rise. As soon as the voltage rises above a predetermined minimum value the low-voltage coil 186 is energized opening voltage responsive contacts 179 and no circuit will be formed thereby when the trip bar 55 passes under the trip lever 61 of the position switch 169.

However, as the dampers 31 and 32 continue to travel and likewise the trip bar 55 connected to the same chains 44 and 45 continues to travel they will reach a position corresponding to a given speed of the pull stand motor 16 and a corresponding speed of the tachometer generator 54. For such a speed, there will be a contact making volt meter or voltage responsive coil in the groups 181 to 186 which receives insufficient voltage to lift the normally closed contacts. Then, when the trip bar 55 reaches the corresponding position, the following action will take place. For example, as illustrated the voltage-responsive coils 186 and 185 are assumed to have received sufficient voltage for actuating them and opening the switch 179 and 178. However, the voltage-responsive coil 184 set for the next higher voltage has not received sufficient voltage to actuate it and the contacts 177 remain closed.

The trip bar 55 in coming under the trip lever 61 of the position switch 167 corresponding to the voltage responsive switch 177, closes the switch 167. A circuit is completed through switches 177 and 167 which has previously been described for energizing the position switch relay 156 and opening the contacts 162 to stop the motor 43. Accordingly the dampers 31 and 32 remain in the position to which they been driven by the motor 43.

The voltage sensitivities of the coils 181 to 186 are correlated with the proper position of the dampers to produce the proper heating for the progressively different speeds of movement of the strip 12. Accordingly, the heat supplied is adjusted so that adequate heating is given the strip 12 to provide the requisite "hot stretch" treatment and subsequent quenching by the cooling medium without over-heating which would damage the material.

The trip bar 55 is of sufficient length to remain under the trip lever 61 in question during the time required for the motor 43 to come to a stop.

If then it is desired to increase the speed of movement, the speed control lever 42 is moved further to the left. With increasing speed, the voltage of the tachometer generator 54 increases; the voltage responsive switch 177 opens and the dampers and the trip bar 55 are again set in motion until the requisite damper position is attained corresponding to the new speed, again effecting proper temperature conditioning of the strip 12. On the other hand, if it should be desired to reduce the speed of movement of the strip 12 and the speed control lever 42 should be moved to the right, the forward contact 147 will be opened, contact 148 will be closed, voltage-responsive contact 178 will drop out, and the motor 43 would be set in motion in the opposite direction driving the dampers 31 and 32 in the opposite direction until the trip bar 55 had gone by. Thereupon the dampers 31 and 32 will again come to rest but closer to the hot air end of the duct 18, thus effecting sufficient reduction in heating supply to avoid damage to the more slowly moving strip 12.

However, if the motor 16 should be stopped by pressing the stop push button 137 or by reason of a failure in the circuit 51, the contacts 141 and 142 of the relay 133 will close. Under this condition, the motor 43 will continue in reverse direction until the damper 31 has been moved as far as possible to the left, actuating the limit switch 56. In this position all the nozzles are cut off, but the heated air blower 23 will not become overloaded by reason of the presence of the relief damper 52 between the pipes 21 and 37, which permits the moving heated air to by-pass the ducts 18 and 19 by lifting the by-pass damper 52. (Not shown in Fig. 19.)

For the sake of simplicity in the drawing and by way of explanation a speed control arrangement for the pull-stand motors has been represented by a speed control arm 42 on a field rheostat tap 129. Moreover a direction control for the damper motor has been represented as provided by a slip clutch 145 connecting the arm 42 to a movable contact cooperating with the direction contacts 147 and 148. It will be understood that the invention does not exclude utilizing a different type of speed control for the pull-stand motor and a mechanical or electrical interlock between such control and means such as the contacts 144, 147 and 148, controlling the direction of the damper motor 43. For example, for adjusting web speed there may be a rheostat motor driven in one direction or the other to vary the field current of the pull-stand motor, actuated simultaneously with the damper motor 43. In this way the rheostat motor runs in the direction to increase the speed of the main driving motor when the damper motor 43 runs in a direction to increase the number of ports admitting heated air to the furnace and vice versa.

It will be apparent that such an interlock may likewise be employed in conjunction with a three-phase damper-driving motor with reversing connections.

Any desired type of mechanical or electrical interlock may be employed. For example, an electrical interlock may comprise two sets of relays so connected that only one set can be energized at a time. When the pull-stand motor speed control such as a push-button control is set for increasing speed, the electrical interlock energizes both the forward drive relay of the damper motor and the increase speed relay in the control circuit for the pull-stand motor. On the other hand when the control is set for decreasing speed the reverse rotation relays are energized.

In order that the dampers will come to a stop quickly and within a predetermined controlled distance after the damper motor is de-energized the damper motor 43 is preferably equipped with a solenoid brake. For example, if desired, a standard motor may be employed such as that manufactured by the Reliance Electric & Engineering Company, Cleveland, Ohio, having an electrically triggered mechanical friction brake built thereon supported by one of the end bells. Such brakes have a manual adjustment by which the braking effect can be varied. As explained in connection with the damper control circuit, the shoe or trip bar 55 for operating the trip arms 61 for the position switches or limit switches has a length which approximates twice the stopping distance of the traveling damper. Such stopping distance is determined by the adjustment of the brake on the damper motor.

Although for the sake of illustration a speed control system for the pull-stand motors has been described employing field current control, the invention does not exclude the use of a speed control system in which the voltage at the armature of the pull-stand motor is varied to control speed by varying generator field strength, comparable to Ward-Leonard types of control. Such type of control would ordinarily be preferable, except for an installation utilizing a dancer roll loaded to supply constant tension, since motor field weakening will tend to produce a tapered tension condition.

The damper control system described in this application may be employed in conjunction with different systems for controlling the relationship between the input and output speeds of the web. It may be assumed for the sake of explanation that the drive motor 15 on the input side is operated at a fixed speed for a given position of the speed control handle 42. Then in the type of control system arranged to maintain constant tension in the traveling web, the speed of the pull-out motor 16 is controlled by maintaining a predetermined fixed armature current therein. This current is computed at a value which would give the desired predetermined web tension since motor torque is a function of armature current.

In a system arranged for obtaining stretch control instead of tension control the desired percentage elongation of the web 12 is obtained by utilization of electrical tachometers on the shafts of both the motors 15 and 16 with controls to maintain a constant predetermined ratio between voltage outputs of the two tachometers. For example, the voltage output of each tachometer may be balanced against a different control value, the difference in control values corresponding to the desired percentage elongation.

For the sake of illustration, however, the operation of the damper control has been described simply in conjunction with the illustrated system in which the tachometer generator 54 is connected to the shaft of the motor 16 for causing the dampers 31 and 32 to take an appropriate position in relation to the speed with which the web 12 leaves the oven 11. The operation of this part of the system is independent of the means employed for controlling the speed relationship between the input and output ends of the web 12.

Alternatively, if instead of the operation described in connection with Fig. 19 it is desired to have the damper motor 43 travel in the reverse direction as soon as the pull stand motor speed control arm 42 is moved back toward the decreased speed position, the arrangement of Fig. 22 may be employed.

As in Fig. 19, for bringing the motor 43 to a stop when the desired damper position has been reached or when the dampers have traveled to either end of the ducts, control relays 155, 156 and 157 are provided, having windings 158, 159 and 160 for actuating normally-closed contacts 161, 162 and 163, respectively. In this alternative arrangement, the normally closed contacts 162 of the position switch relay 156 are connected in the circuit of the forward winding 151 of the motor 43 instead of the common connection to the directional switch blade 144. An additional position switch relay 213 is provided for position control in the reverse-running direction. It has an actuating winding 214 and a pair of normally closed contacts 215, connected through conductors 216 and 217 in series with the reverse field winding 152. The limit switches 56 and 57, as shown in Fig. 22, are normally open switches with trip levers 61 adapted to be engaged by the trip bar 55 for closing the switch contacts 56 and 57 when the trip bar 55 reaches either limit of travel corresponding to the damper limits of travel.

The bank of position switches 58 includes a plurality of switches of any desired number according to the precision of control desired. For the sake of illustration, six normally-open switches 164, 165, 166, 167, 168 and 169 are provided having a common terminal 171 and each having a trip lever 61 adapted to close the switch in question when the trip bar 55 passes under it. This is illustrated by the closed switch 167. The switches 164 to 169, inclusive, are mounted in housings such as illustrated in connection with switch assembly 59 shown in Figs. 10 and 11.

In series with the bank of position switches 58 there is a bank of speed-responsive switches 173, comprising in the case of Fig. 22 a plurality of double-throw switches 174 to 179 equal in number to the number of position switches in the bank 58. As illustrated, each double throw switch has both normally-open and normally closed contacts. As in the case of Fig. 19, the switches 174 to 179 are so constructed as to become responsive to progressively greater speeds of the strip 12. Preferably this is accomplished by providing a speed-responsive generator not shown in Fig. 22 but which may be one such as the tachometer generator 54 described in connection with Fig. 19 and by making the switches 174 to 179 in the form of contact making voltmeters, each set for a progressively higher voltage. Accordingly, the switches 174 to 179 inclusive, include voltage responsive windings 181 to 186, respectively, all connected in shunt and connected by a pair of conductors 187 to the tachometer generator which corresponds to the previously described tachometer generator 54.

A forward running circuit for the damper motor 43 may be traced from the alternating-current terminal 189 to the terminal 154, through the armature of the motor 43 to the junction terminal 153, the forward field winding 151, the conductor 191, normally closed contacts 161 of the forward limit switch relay 155, a conductor 218, normally closed contacts 162 of the forward position switch relay 156, a conductor 192, a contact 147, the directional switch blade 144, a conductor 199, the contacts 143, which are closed when the relay 133 is energized, and the conductor 195 back to the remaining alternating-current circuit terminal 188.

As in the case of the arrangement in Fig. 19, a reverse running circuit for the damper motor 43 is provided from the terminal 189 to the armature terminal 154, through the motor armature, the field junction 153, the reverse field winding 152, a conductor 196, the normally closed contacts 163 of the reverse limit switch relay 157, the conductors 197 and 217, the normally closed contacts 215 of the reverse position switch relay 213, the conductor 216, the contact 148, the directional switch blade 144, the conductor 199, the contacts 143 (which are closed) and the conductor 195 back to the alternating-current terminal 188.

When the pull stand motor 16 is de-energized with no current flowing through the coil 139, so that the movable contact 141 drops across the stationary contacts 142, an alternative reverse running circuit or fail-safe circuit is provided in Fig. 22. This serves for restoring the damper 31 to the lefthand end of the duct 18 in which all of the nozzles are cut off from the heated air so as to avoid over-heating the strip 12 in case the motor 16 should come to a stand still. The alternative or fail-safe reverse running circuit takes place from the terminal 189 to the armature terminal 154, through the armature to the junction terminal 153, reverse field winding 152, conductor 196, closed contacts 163, conductors 197 and 219, the normally-closed contacts 141 and 142 and conductor 195 back to the terminal 188 of the alternating-current source 49.

In case the dampers 31 and 32 should be driven to the limit of their forward direction, the trip bar 55 lifts the lever 61 of the forward limit switch 56, thereby closing the switch 56 and forming a circuit from the alternating-current terminal 188 through conductor 201 through the switch 56, which is then closed, a conductor 202, the winding 158 of the relay 155, a conductor 203, a conductor 204 back to the remaining alternating-current terminal 189.

Energization of the winding 158 opens the normally closed contacts 161, thereby breaking the forward-running circuit of the motor 43 between the conductors 191 and 218 and bringing the motor 43 to a stop. On the other hand in the event that the dampers 31 and 32 should be driven to the limit of their motion in the reverse direction, the trip bar comes under the trip lever 61 of the reverse limit switch 57, closing the switch contacts and forming a circuit through the winding 160 of the reverse limit switch relay 157. This lifts the normally-closed contact 163 and breaks the reverse-running circuit.

As the trip bar 55 travels in one direction or the other, it passes under the trip lever 61 of one or more of the position switches 164 to 169 inclusive. For example, if the trip bar moves forward (to the left) to the position illustrated in Fig. 22, a position switch 167 is closed. If then the speed of strip 12 is such that the corresponding voltage-responsive switch 177 remains de-energized, a circuit is formed through the position-switch relay winding 159. Such a circuit may be traced from the terminal 188 through conductor 195, conductor 222, terminal 171, conductor 211, the switch 167, which has been closed, the conductor 209, the normally closed contact 221 of the double-throw voltage responsive switch 177, conductor 208, conductor 212, the winding 158, conductor 204 back to remaining alternating-current terminal 189. Thus, if any associated pair of switches in the switch banks 58 and 173 should be closed, the relay 156 is energized to open the normally closed contacts 162 and break the circuit to the motor 43 between the conductors 218 and 192 if the pull stand motor 16 is running and the contacts 142 are open.

The manner in which the dampers 31 and 32 are positioned in accordance with required heating of the strip 12 for the purpose of heat treatment and quenching at any speed of travel, is as follows:

As soon as the motor 16 is started by depressing the starting button 136, the speed control handle 42 is moved toward the left so as to move the field rheostat tap 129 from the full field position at the "slow" end of the rheostat 128 causing the directional switch blade 144 to move against the contact 147. This closes the forward circuit through the forward field winding 151 and the motor 43, previously described, and starts the motor 43. The latter thereupon moves the dampers 31 and 32 in the forward direction indicated by the arrow F on the duct 18 to positions to open progressively more of the ports 27 so as to increase the supply of heating medium to the furnace 11. At the same time, as the motor 16 speeds up, speed of rotation of the tachometer generator 54 increases, causing the voltage to rise. As soon as the voltage rises above a predetermined minimum value the low-voltage coil 186 is energized opening normally-closed voltage-responsive contacts 223 of the voltage responsive switch 179. Consequently, no circuit would be formed thereby when the trip bar 55 passes under the trip lever 61 of the position switch 169.

However, as the dampers 31 and 32 continue to travel and likewise the trip bar 51 connected to the same chains 44 and 45 continues to travel they will reach a position corresponding to a given speed of the pull stand motor 16 and a corresponding speed of the tachometer generator 54. For such a speed, there will be a contact making voltmeter or voltage-responsive coil in the group 181 to 186 which receives insufficient voltage to lift the normally-closed contacts. Then, when the trip bar 55 reaches the corresponding position, the following action will take place. For example, as illustrated, the voltage-responsive coils 186 and 185 are assumed to have received sufficient voltage for actuating them and opening the normally closed contacts of switches 179 and 178. However, the voltage-responsive coil 184, set for the next higher voltage, has not received sufficient voltage to actuate it and the normally-closed contacts 221 of the switch 177 remain closed.

The trip bar 55 in coming under the lever 61 of the position switch 167, corresponding to the voltage responsive switch 177, closes the switch 167. A circuit is completed through the contacts 221 and the switch 167 which has previously been described for energizing the position switch relay 156 and opening the contacts 162 to stop the motor 43. Accordingly the dampers 31 and 32 remain in the position to which they have been driven by the motor 43.

The voltage sensitivities of the coils 181 to 186 are correlated with the proper positions of the dampers to produce the proper heating at the progressively different speeds of movement of the strip 12. Accordingly, the heat supplied is adjusted so that adequate heating is given the strip 12 to provide the requisite "hot stretch" treatment and subsequent quenching by the cooling medium without over-heating, which would damage the material.

The trip bar 55 is of sufficient length to remain under the trip lever 61 in question during the time required for the motor 43 to come to a stop. Preferably the trip bar 55 is, moreover, of sufficient length so that the next position switch will be closed at least as soon as the previous one has been disengaged as it travels in one direction or the other. If then it is desired to increase the speed of movement, the speed control lever 42 is moved further to the left. With increasing speed, the voltage of the tachometer generator 54 increases, the normally-closed voltage-responsive switch contacts 221 open; and the dampers and the trip bar 55 are again set in motion until the requisite damper position is attained corresponding to the new speed, again effecting proper temperature conditioning of the strip 12.

On the other hand, if it should be desired to reduce the speed of movement of the strip 12 and the speed control lever 42 should be moved to the right, the forward contact 147 will be opened, contact 148 will be closed, and the motor 43 will be set in motion in the opposite direction driving the dampers 31 and 32 in the opposite direction. This motion will continue until the trip bar 55 has reached the position of one of the voltage responsive switches which remains energized at the reduced speed and voltage of the tachometer generator 54 corresponding to the new position of the speed control lever 42. Thereupon the dampers 31 and 32 will again come to rest but closer to the hot air end of the duct 18, thus effecting sufficient reduction in heating supply to avoid damage to the more slowly moving strip 12.

For example, in the arrangement illustrated in Fig. 22, if the dampers and the trip bar 55 move in the opposite direction responsive to the reversal of the motor 43, the trip bar 55 moving to the right, it will approach the position of the position-switch 168. It will be assumed that the voltage of the tachometer generator 127 has not fallen off so much as to cause the winding 185 of the voltage-responsive double-throw switch 178 to release the normally-open contacts 224. Consequently, as soon as the switch 168 is closed by the action of the trip bar 55, the circuit will be closed between conductors 225 and 211. This will energize the reverse position switch relay winding 214, opening the normally closed contacts 215 and breaking the circuit through the reverse running winding 152 of the motor 43. The circuit for energizing the winding 214 may be traced through elements 189, 204, 214, 226, 225, 224, 168, 211, 171, 222, and 188.

The normally-closed contacts 215 are interposed in the portion of the connections to the reverse running winding 152 between the reverse-running stationary contact 148 of the directional switch blade 144 and the conductor 197 in order not to interfere with the operation of the fail-safe circuit contacts 142. In any event, if the motor 16 should be stopped by pressing the stop push button 137 or by reason of a power failure in the circuit 51, the contacts 141 and 142 of the relay 133 will close. Therefore, irrespective of the position of the trip bar 55 or the condition of the position switch in the bank 58, or the voltage responsive switches in the bank 173, or the action of the windings 155, 159 and 214 of the position relays, in event of interruption of power to the motor 16 the motor 43 will continue in reverse direction until the damper 31 has been moved as far as possible to the left, actuating the limit switch 56. When the limit switch 56 closes as previously described, the winding 155 will be energized lifting the contacts 161 and breaking the reverse running circuit through the winding 152 of the motor 43.

In this position all the nozzles are cut off, but the heated air blower 23 will not become overloaded by reason of the presence of the relief damper 52 between the pipes 21 and 37, which permits the moving heated air to by-pass the ducts 18 and 19 by lifting the relief damper 52. (Not shown in Figs. 19 and 22.)

The structure of the by-pass dampers 52 and 53 is illustrated in greater detail in Fig. 20. As illustrated, the dampers each comprises a vane 231 supported near one edge on a pivot shaft 232 which is mounted near the edge, for normally closing an opening 233 in the common horizontal wall 96 (Fig. 9) of the ducts 18 and 19. The vane 231 is of such size as to extend its edge 234 slightly beyond the corresponding edge 235 of the by-pass opening 233. Thus, normally the vane 221 rests on the ledge formed at the edge 235, closing the opening 233. In order to avoid premature lifting of the vane 221, an arm 236 carrying weights 237 may be secured to the shaft 232. The arm 236 may be arranged so that the weights 237 augment the force of gravity acting on the vane 231. In this case the mass or position of the weights 237 may be selected to correspond to a pressure upon the vane 231 exceeding that which is required for delivering the heated air to the supply nozzles.

The invention is not limited, however, to arranging the arm 236 to cause the weights to augment the force of gravity on the vane 231 and does not exclude the arrangement of the arm 236 and weights 237 to counterbalance in part the vane 231, as illustrated in Figs. 20 and 21. In this manner relatively little pressure is required to lift the vane 231 and bypass the air delivered by the blower, insuring no ill effects from possible leakage around the damper 31 if pressure were allowed to build up in the hot air pipe 21.

For simplicity in Figures 19 and 22 the tachometer generator 54 has been shown as connected directly to the windings 181 to 186, inclusive, of the voltage and speed responsive switches 174 to 179 inclusive. It will be understood, however, that the invention is not limited to this arrangement and tachometer relays may be interposed. If desired, for example, the switches 174 to 179 inclusive may be power relays such as model 712 relays controlled by tachometer relays or contact-making tachometer indicators. As illustrated in the fragmentary diagram of Fig. 23, the tachometer generator 54 is connected through conductors 187 to a contact making tachometer indicator 241. A separate tachometer indicator such as 241 shown in Fig. 23 is provided for each of the relays 174 to 179, inclusive, but for simplicity only one of them is shown in Fig. 23, represented as connected for actuating the relay 178 which is illustrated for the condition with its winding 185 energized.

The contact-making tachometer indicator 241 includes a pair of stationary contacts 243 and 244 for response a fast and slow conditions respectively and a movable member 245 adapted to making contact with one or the other of the stationary contacts 243 or 244 according to the voltage applied to the schematically indicated movement 246 which is connected through the conductors 187 to the tachometer generator 54.

For the sake of illustration, the power relay 178 in this case is shown as a low-voltage direct-current relay adapted to be energized by a source of low-voltage direct-current such as a Model 9980 Rectoformer 248. The Rectoformer 248 includes a primary winding 249 connected to the alternating-current source 49 and output terminals 250 connected through conductors 251 and 252 to the stationary contacts 243 and 244, respectively, of the tachometer relay 241. The power relay 178 is illustrated as having a pair of stationary holding contacts 253 and 254 cooperating with a movable contact 255, being normally open contacts. Cooperating with the stationary contact 224 is a second stationary contact 256 and a movable contact 257, being normally open contacts. Also cooperating with the movable contact 257 is a pair of stationary contacts 258 and 259, being normally closed contacts. The power relay winding 185 has terminals 261 and 262 across which a shunting resistor 263 is connected. The terminal 261 is connected through a conductor 264 to the movable contact 245 of the tachometer relay 241 and the terminal 262 is connected through conductors 265 and 266 to the "slow" stationary contact 244 of the tachometer relay 241. In order to provide a holding circuit, a current-limiting resistor 267 is connected between the terminal 261 of the power relay winding 185 and the stationary holding contact 253, the stationary holding contact 254 being connected through a conductor 268 to the "fast" stationary contact 243 of the tachometer relay 241.

When the speed of the moving strip 12 is such that the tachometer 54 produces sufficient voltage to exceed that for which the tachometer indicator 241 is set, the movable member 245 of the tachometer indicator 241 deflects to the right making contact with the stationary contact 243. Accordingly a direct-current circuit is provided from the direct current terminals 250 through the conductor 251, stationary contact 243, the movable contact 245 of the tachometer indicator 241, the conductor 264, the winding 185 of the relay 178, the conductor 265 and the conductor 252 back to the direct-current Rectoformer terminals 250. This energizes the winding 185 of the relay 178 causing it to lift the movable contacts 255 and 257. A holding circuit is closed by the contact 255 from the direct-current terminals 250 through the conductor 251, the conductor 268, contacts 254, 255 and 253, the holding circuit resistor 267, the winding 185, and the conductors 265 and 252 back to the direct-current output terminals 250.

In this manner small fluctuations in speed of the moving strip do not cause incessant operation of the relays. However, if the speed should fall off appreciably the moving member 245 is deflected to the left making contact with contact 244. Thereby a shorting circuit is provided around the winding 185 from the terminal 261 through the conductor 264, the movable contact 245, stationary contact 244, conductors 266 and 265 to the remaining terminal 262 of the winding 185. The winding 185 is thus shunted out of the circuit. The voltage drop in the holding resistor 267 prevents overload of the direct-current supply source 248. Thereupon the relay 178 drops out and opens the circuit between stationary contacts 253 and 254.

When the relay 178 is energized, the lifting of the movable contact 257 against the stationary contacts 224 and 256 closes an energizing circuit for the winding 214 from the alternating-current terminal 188 through conductors 195, 222, switch 168 (if closed), contact 256, movable contact 257, stationary contact 224, conductor 226, winding 214, conductor 204 back to the alternating current terminal 189.

The supporting arrangement for the grating of safety wires 41 is shown in greater detail in Figs. 24 and 25. The wires 41 are resiliently supported at one end, for example, at the left hand end as shown in Fig. 18. For suitably spacing the wires 41, slotted closure plates or comb plates 271 are provided as illustrated in Fig. 26 having a horizontal slot 272 through which the nylon strip 12 travels and being provided with transverse slots or notches 273 to receive and space the wires 41. For resiliently securing the wires 41, brackets 123 and 124 are provided with openings 275 to receive bolts 276 provided with helical springs 277, each surrounding the threaded end 278 of a bolt 276 between a horizontal wing 279 of the bracket 124 and a nut 281 on the threaded end of the bolt 276. The upper end of each of the bolts 276 is provided with a slot 282 sloping downwardly and outwardly as shown in Fig. 24a to receive a loop or bight 283 formed in the end of the wire 41 by twisting the end 284 of the wire back around the standing part 285 of the wire.

In order that the force of the spring 277 may be applied at right angles to the length of the main part of the wire 41 and without kinking the wire, circular thrust members 286, of large diameter in comparison with the wire 41, are provided. They are secured to the entry wall 121 of the oven 11. For example, as shown in greater detail in Fig. 24, spacing blocks 287 may be provided and the thrust member 286 may be hollow, in the form of large diameter tubing with suitable fastening members such as bolts 288 passing through the wall of the member 286, the spacing blocks 287, the comb plate 271 and the oven wall 121. The brackets 123 and 124 are likewise secured to the wall 121 in a suitable manner as by means of bolts 291 passing through spacing blocks 292 and the oven wall 121.

If desired the opposite end of the wires 41 may also be resiliently supported but preferably the entire adjustment of the tension of the wires 41 is made by adjustment of the nuts 281 and the opposite end, in this case the right hand end of each wire 41, is fixed to a member 293 similar to the member 286 secured in a suitable manner by means of bolts or the like passing through the spacing block 287, the comb plate 271 and the exit wall 122, as shown in greater detail in Fig. 25. For securing the right hand end 294 of the wire 41 the supports 125 and 126 may take the form of eye bolts secured in the member 293 having eyes 295 and preferably welded in place as shown by the welds 296. A chain link member 297 is provided, which links the eye 295 and receives a bight or loop 298 formed in the end of the wire 41 by twisting the end 294 around the standing part 299. As in the case of the left hand end of the wires 41, the portion of the member 293 against which the wire 41 rests is of large diameter in comparison of diameter of the wire to avoid kinking or straining the wire.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

What we claim and desire to secure by Letters Patent of the United States is:

1. In a heat-treating furnace for traveling sheet material having motor driven means for moving the sheet material in a linear path, and means for supplying hot and cold gaseous media, the combination comprising a duct extending along the sheet-material path adjacent thereto, connections at opposite ends of said duct for receiving hot and cold gaseous media respectively, bifurcated nozzles extending laterally from said duct with legs straddling the said path and connecting said duct, said legs having orifices for directing said gaseous media against material traveling in said path from either side thereof, a damper within said duct for separating hot and cold gaseous media therein and causing hot gaseous medium to flow from the nozzles connected to the duct between one end thereof and the damper, and causing cold gaseous medium to flow from the nozzles between the other end of said duct and the damper, the damper being movable longitudinally with respect to the duct, a control device responsive to speed with which sheet material is caused to travel in its path, and means for moving the damper to a position within the duct between the ends thereof dependent upon the speed of travel of the sheet material for adjusting the heating thereof according to its speed.

2. In a heat-treating furnace for traveling sheet material having means for moving sheet material in a linear path, and means for supplying hot and cold gaseous media and recirculating them, the combination comprising supply and recirculating ducts one above the other and extending along the sheet-material path adjacent thereto, connections at opposite ends of the supply duct for receiving hot and cold gaseous media respectively, exhaust connections at opposite ends of the recirculating duct, bifurcated supply nozzles extending laterally from said supply duct with legs straddling the said path and connected to said supply duct, said legs having orifices for directing said gaseous media against material traveling in said path, bifurcated recirculating nozzles extending laterally from said recirculating duct with legs straddling said path and connected to said recirculating duct, the legs of said recirculating nozzles having vents for withdrawing gaseous media, said supply and recirculating nozzles being alternately mounted along the sheet material path, dampers within the ducts each for separating the portion of a duct to one side of the damper from the portion of the duct to the other side thereof, the dampers being movable within the ducts longitudinally with respect thereto and interconnected mechanically so that the damper in the recirculating duct is spaced from that in the supply duct a longitudinal distance equal to the longitudinal distance between supply and recirculating nozzles, a control device responsive to speed with which sheet material is caused to travel in its path, and means for moving the dampers to positions between the ends of said ducts dependent upon the speed of travel of the sheet material for adjusting the heating thereof depending on its speed.

3. In a furnace having means for supporting and advancing a continuous charge along a predetermined path, a plurality of input ports distributed along the charge path, said charge supporting and advancing means being adapted to receive a heat absorbing charge at adjustable rates of speed, the combination comprising a duct extending along said input ports with connections thereto, having an input end for receiving hot gaseous media, a damper within said duct movable longitudinally with respect thereto, a control device responsive to a magnitude responsive to the rate at which the furnace charge is advanced and capable of absorbing heat, and means for moving the damper to a position within the duct dependent upon such rate for adjusting the number of open ports and thereby adjusting the heating of the charge according to such rate.

4. In a continuous heat-treating furnace adapted to receive moving material and to have the speed thereof adjusted, the combination of a duct extending along the furnace having a plurality of ports adapted to supply heating medium to the furnace, a damper movable longitudinally within the duct for adjusting the number of open ports to adjust the rate of heating, chain means extending longitudinally within the duct connected to said damper and extending externally of the duct in a closed circuit, sprocket means engaging the chain means with driving means to drive the chain for adjusting the damper position, a contact shoe secured to the chain means in the portion thereof externally of the duct, a plurality of switch means mounted along the path of the contact shoe adapted to be actuated by engagement of the shoe therewith when the chain means moves longitudinally in response to the action of the drive means, a plurality of speed responsive means successively responsive to greater speeds, each one adapted to cooperate with one of said contact shoe switch means, and means responsive to conjoint actuation of one of said speed responsive means and one of said switch contact means for de-energizing the sprocket drive means, whereby the drive means continues to move said damper and said contact shoe until an associated speed responsive means and contact shoe switch means are conjointly actuated, whereby the position of the damper within a duct is adjusted according to the speed of movement of material into the furnace for adjusting the heating rate to the speed of such movement.

5. A damper positioner and control for a heating system of the movable damper type in which the amount of heating depends upon the position of the damper and material to be heated is fed to the heating system at a rate which may be adjusted, said positioner and control comprising a voltage-generating device responsive to the speed of movement of material into the heating system, a damper motor with means connecting it to the damper for driving it to adjust the damper position, a shoe connected to said connecting means constrained to move along a predetermined path, damper position switches in the path of said shoe adapted to be actuated thereby, voltage-responsive switches having actuating winding means connected to said voltage-generating device, rendering said voltage-responsive switches successively responsive to successively greater magnitudes of voltage, each of said voltage-responsive switches being connected to a different one of said position switches, terminals adapted to be connected to a current source for energizing said damper motor, said voltage-responsive switches and shoe-responsive switches being connected as a bank in operative circuit relationship to said motor and said current-source terminals whereby the conjoint action of one of the said voltage switches and one of the said position switches de-energizes the motor to bring the damper to a stop in a position dependent upon the speed of movement of material into the heating system for adjusting the heating in dependence thereon.

6. Apparatus for positioning a movable member in accordance with variations in magnitude of a variable control quantity, said apparatus comprising in combination a voltage-generating device responsive to the magnitude of the control quantity, a motor for driving the movable member to a position in accordance with variations in magnitude of the control quantity, a movable contact actuating shoe mechanically connected to said motor and caused to be driven thereby along a predermined path, a bank of position switches in the path of said shoe adapted to be actuated thereby, a bank of voltage responsive switches having winding means responsive to said voltage generating device for actuating successive switches in response to successively greater magnitudes of voltage, each voltage-responsive switch being connected to a different one of said position switches, terminals adapted to be connected to a current source for energizing said positioning motor, said banks of position switches and voltage-responsive switches being operatively connected in the circuit of said current source terminals and motor whereby the conjoint actuation of one of said voltage responsive switches and one of said position switches de-energizes the motor to bring it to a stop in a position dependent upon the magnitude of the variable control quantity.

7. A damper adapted for movement longitudinally in a duct comprising a rectangular plate, a carriage supporting said plate secured thereto at the ends of the lower edge thereof and braces extending from the ends of the carriage to the side surface of the plate, said carriage comprising a pair of parallel bars, cross rods connecting the ends of the bars, flanges intermediate the ends of each bar secured to the damper plate adjacent the lower edges thereof and low-friction means on the under surface of the bars.

8. A protective system for apparatus through which longitudinally extending sheet material is passed under tension, said system comprising in combination an entry wall and an exit wall each having a slot through which material under tension may be passed, supports above and below said slots secured to said walls, a plurality of spaced wires secured at one end to the support at one such wall and resiliently secured at the other end to the support at the other such wall, said wires passing through said slots in two groups lying in planes spaced one from the other providing passageway therebetween through which material under tension may be passed whereby in event of rupture of such material it is confined to the space between said planes.

9. In a heat-treating furnace for traveling sheet material having means for moving the sheet material in a linear path, and means for supplying a hot gaseous medium, the combination comprising a duct extending along the sheet material path adjacent thereto with an input end for receiving hot gaseous medium, nozzles extending from said duct toward the sheet material path for heating material therein, a damper within said duct for arresting the flow of hot gaseous medium from the duct beyond the damper position and confining the flow of gaseous medium from the nozzles to those between the input end of the duct and the damper, the damper being movable longitudinally with respect to the duct, and a control device responsive to speed with which sheet material is caused to travel in its path for moving the damper to a position within the duct dependent upon the speed of travel of the sheet material for adjusting the heating thereof according to its speed.

10. A control system for positioning a member in accordance with variations in magnitude of a variable quantity comprising in combination a reversible motor for driving such member and having branch circuits, one or the other of which is adapted to be energized to produce motion of the motor in forward and reverse directions, a plurality of normally open position switches, a plurality of double-throw speed responsive switches each with a normally closed contact and a normally open contact and means for shifting successive speed-responsive switches from normally closed to normally open contacts in response to progressively greater magnitudes of the variable quantity, each of the position switches being associated with one of the speed responsive switches and adapted to have one or the other of the contacts of the speed responsive switches connected in series with the position switch; a trip bar mechanically connected to the motor and adapted to move in the path of the position switches for closing a selected one of said position switches according to the position of the member driven by said motor; a double-throw direction-control switch having a pair of alternative contacts, each in one of the branch circuits of said motor; a pair of relays each having normally closed contacts in one of said branch circuits and having a winding in the circuit of one of the contacts of each of the speed responsive switches, whereby upon movement of the direction control switch toward one or the other of its contacts, the reversible motor is energized and continues to run until the trip bar is moved to a position where it engages and closes a position switch associated with a speed responsive switch which has closed its contact in the circuit of the relay winding having its contact in the energized branch of the motor circuit for energizing such winding and interrupting the motor circuit to bring the motor to a stop.

11. A control system for positioning a member in accordance with variations in magnitude of a variable quantity comprising in combination a motor for driving such member and a circuit adapted to receive electrical energy from a source and feed such energy to the motor, said circuit including a bank of position switches, a bank of variation-responsive switches successively responsive to progressively greater magnitudes of the variable quantity, each position switch being associated with one of the variation-responsive switches as a motor de-energizing pair whereby motor operation is responsive to conjoint actuation of a pair of associated switches in said switch banks, and the motor being connected to run until the member has been driven to a position dependent upon the magnitude of the variable quantity and such conjoint switch action de-energizes the motor.

12. In an apparatus for conditioning traveling sheet material having means for moving a continuous strip of such sheet material in a linear path and means for supplying hot and cold gaseous media to the moving strip, the combination comprising a duct extending along the sheet material path adjacent thereto, connections at opposite ends of said duct for receiving hot and cold gaseous media respectively, nozzles extending from said duct for supplying gaseous medium to the sheet material path, a damper within said duct for separating hot and cold gaseous media therein and causing hot gaseous medium to flow from the nozzles connected to the duct between one end thereof and the damper and cold gaseous medium to flow from the nozzles connected to the duct between the other end thereof and the damper, the damper being movable longitudinally with respect to said duct, a control device responsive to the speed with which such sheet material is caused to travel in its said path, and means for moving the damper to a position within the duct between the ends thereof dependent upon the speed of travel of such sheet material for adjusting the heating of such sheet material according to its speed.

13. In a furnace for the heat treatment of material moving continuously along a predetermined path through the furnace, the furnace being formed with ports along the path of the material, the combination comprising a duct extending along said ports and having an input end adapted to receive hot gaseous medium, a damper within said duct and movable longitudinally therein, a control device responsive to the speed with which such material is caused to travel along said path through the furnace, and means actuated by said control device for moving the damper to a position within the duct dependent upon the speed of travel of the material for adjusting the number of open ports and thereby adjusting the heating of such material according to its speed of movement.

14. In a heat-treating furnace apparatus for traveling sheet material having means for moving sheet material in a linear path and means for supplying hot and cold gaseous media and recirculating them, the combination comprising supply and recirculation ducts extending along the sheet material path and adjacent thereto, supply connections at opposite ends of the supply duct for receiving from the supplying means the hot and cold gaseous media respectively, exhaust connections at the ends of the recirculation duct, supply nozzles extending laterally from said supply duct for directing gaseous media against material traveling in said path, recirculation nozzles extending laterally from said recirculation duct with vents adjacent such path for withdrawing gaseous media, said supply and recirculation nozzles alternating along the sheet material path, dampers within the ducts each separating that portion of the duct between one side of the damper and one of the duct end connections from that portion of the duct between the other side of the damper and the other of the duct end connections, the dampers being movable within the ducts longitudinally with respect thereto, and the ducts being interconnected mechanically so that the damper in the recirculating duct is spaced from that in the supply duct a longitudinal distance equal to the longitudinal distance between the supply and recirculation nozzles.

15. Apparatus as in claim 14 wherein a control device is provided responsive to speed with which sheet material is caused to travel in its path, and means for moving the dampers longitudinally in their respective ducts to positions between the duct ends dependent upon the speed of travel of the sheet material for adjusting the heating of the sheet material depending upon its speed.

16. In an elongated heating system having a longitudinal duct providing a passage for carrying heating media, lateral connections along said duct through which carried heating medium may be distributed, a damper within said duct and separating the portions of the duct passage on either side of the damper from each other, anti-friction means supporting the damper in said duct, endless chain means having an inside run extending longitudinally through the duct and another run external to the duct, said chain means being mechanically connected to said damper, sprocket means engaging the chain to actuate the latter, drive means for the sprocket means to effect movement of the damper within the duct, a contact shoe secured to the external run of the chain means, limit switches mounted along the path of the external run of the chain means and adapted to be engaged by said contact shoe, the shoe having extreme positions in which it engages such switches corresponding to the desired end positions of the damper within the duct, and means for de-energizing said sprocket drive means in response to such engagement of the shoe and one of the switches at one of the extreme positions.

17. Apparatus as in claim 4 wherein the contact shoe has a length in the direction of its path greater than the spacing between adjacent switch means whereby at least one of the switch means is engaged by the shoe during the entire movement of the shoe along its path.

18. Apparatus as in claim 4 wherein the contact shoe has a length in the direction of its path exceeding the distance within which the sprocket drive means is capable of stopping when de-energized.

19. A damper positioner and control for a heating system of the movable damper type in which the amount of heating depends upon the position of the damper and in which material to be heated is fed to the heating system at a rate which may be adjusted, said positioner and control comprising in combination a voltage-generating device responsive to the speed of movement of such material into the heating system, chain means connected to the damper of the system for moving the damper to different positions, a damper motor connected to said chain means for driving it to adjust the damper position, a shoe connected to said chain means for movement along a predetermined path, damper position switches in the path of said shoe and adapted to be actuated by the shoe seriatim, a bank of voltage-responsive switches each having an actuating winding connected to said voltage generator, each switch being responsive to a different magnitude of voltage, each of said voltage responsive switches being related to a different one of said position switches, terminals in circuit with the damper motor and adapted to be connected to a source of electrical current for energizing said damper motor, said motor circuit including a normally closed contactor having a control winding for opening said circuit, and said control winding being connected in a series circuit with a current supply source, with the bank of voltage responsive switches, and with the damper position switches, the conjoint actuation of one of said voltage responsive switches and that one of said position switches related thereto energizing said contactor winding to deenergize the motor and stop the damper in a position dependent upon and corresponding to the speed of movement of such material into the heating system, thereby adjusting the heating in relation to the feed rate of such material.

20. Apparatus as in claim 5 wherein the damper motor is reversible and has forward and reverse circuits, the combination of an adjustable speed drive means for advancing material through the furnace system, a speed controller, directional limit switch means associated in a circuit with such speed controller for energizing the forward circuit of the damper motor when the speed controller is moved toward increasing speed position and for energizing the reverse circuit of the damper motor when the speed controller is moved toward decreasing speed position.

21. Apparatus as in claim 20 wherein an interlock de-energizes the damper motor until the material advancing means is actuated.

22. Apparatus as in claim 20 wherein a normally closed by-pass effects energization of the reverse circuit of the damper motor automatically when the material advancing means is de-energized.

23. Apparatus as in claim 20 wherein limit switch means is provided in an end position in the path of the contact shoe corresponding to a desired end position of the damper, said last named switch means being connected to de-energize the directional circuit of the damper motor when the shoe reaches such end position toward which it is driven when such circuit energizes the damper motor.

24. A heat-treating furnace comprising means defining an elongated chamber, a plurality of elongated supply and return nozzles, said nozzles being mounted within and each extending transversely across said chamber from one of the sides of the latter, the supply nozzles alternating with the return nozzles in interfingered relation along the length of said chamber, the nozzles each being bifurcated with legs adapted to straddle a longitudinal plane in the chamber to provide a path for sheet material, means providing confronting orifices on the inner surfaces of said nozzle legs, a supply duct paralleling and disposed along one of the sides of said chamber, each supply nozzle being connected to said duct, said duct being adapted to receive a fluid conditioning medium for delivery to points spaced along the length of said chamber through said supply nozzles, a return duct paralleling and disposed along one of the sides of said chamber, and the return nozzles being individually connected to the return duct for exhausting delivered fluid medium from the interior of the chamber at points spaced along the length of such chamber located intermediate the delivery points.

25. In a heat-treating furnace having a chamber for material to be conditioned, supply and return ducts, the supply duct having a series of ports spaced along its length and communicating with the conditioning chamber of the furnace, for delivering a fluid conditioning medium to material in such chamber, means for progressively closing the ports to vary the delivery rate of the medium, the supply duct having an infeed portion, the return duct having an outfeed portion, blower means connected to the infeed portion of the supply duct for continuously furnishing a fluid conditioning medium under pressure, said infeed and outfeed duct portions being located in close juxtaposition and being formed with registering openings providing a connecting passage between the ducts, a by-pass damper, and means mounting the damper for swinging movement to and from a closed position across the connecting passage, the damper being biased to closed position normally preventing the flow of conditioning medium from one duct to the other and being adapted automatically to open the connecting passage upon a predetermined increase in pressure of the fluid conditioning medium in the supply duct resulting from closure of the delivery ports whereby conditioning medium is by-passed directly into the outfeed portion of the return duct from the infeed portion of the supply duct.

26. In a furnace structure having a frame and defining a passageway for the movement of continuous strip sheet material longitudinally therethrough under tension, a plurality of nozzles distributed along said passageway in the direction of strip movement for supplying gaseous media to such sheet material for temperature conditioning thereof, and a filar safety barrier paralleling said passageway between the path of a strip moving through said passageway and said nozzles, said barrier comprising a multiplicity of tensioned wire elements disposed substantially in a common plane in parallel relation to one another, such wire elements being fixed at their ends to the furnace frame adjacent the ends of the passageway and supported independently of one another, said barrier being disposed to parallel in noncontacting relation material moving through the passageway for protecting nozzles and other structure as well as personnel in the event of rupture of such tensioned material.

27. The method of heat treating continuous sheet material which comprises continuously advancing the material under tension and over a predetermined path, directing constant temperature heated fluid medium against the surface of the material within one portion of said path, thereafter directing relatively cool constant temperature fluid medium against the same surface of the material within another portion of said path, and automatically adjusting the ratio between the lengths of said path portions in accordance with variations in speed of advancement of the sheet material for maintaining the heating of the material substantially uniform regardless of its speed.

28. The method of heat treating continuous strip material moving longitudinally through an elongated chamber at variable speed which comprises supplying relatively hot fluid medium along a path paralleling said elongated chamber from one end of said path, supplying relatively cool fluid medium along the same path from the opposite end thereof, separating the portion of the path receiving hot fluid medium from the portion receiving cold fluid medium, diverting the supplied hot and cold fluid media to flow laterally from said path into the chamber containing the moving strip material, the portion of the path in which hot fluid media is diverted being at the end of the chamber in which the moving material enters such chamber whereby the material is first heated and then cooled, and automatically varying the relative lengths of the paths from which the hot and cold media are diverted in accordance with variations in the speed of movement of the strip material for maintaining substantially uniform heating of such material independently of variations in its speed.

29. In combination a duct of rectangular cross section composed of sheet material, a pair of parallel beams secured to and in adjacent corners of the duct, and a damper extending transversely within the duct and mounted for movement in the longitudinal direction of the duct, said damper having a panel plate member and a carriage with rollers riding on said parallel beams whereby the beams serve as duct reinforcements and tracks for said carriage, said carriage comprising a pair of spaced parallel longitudinal bars to which said rollers are rotatively attached, means attaching the ends of said panel member of the damper to the bars intermediate their ends, said damper having braces extending from the ends of the carriage diagonally toward and secured to the damper panel.

30. A damper as in claim 7 wherein the braces comprise angular metal members each having a straight section and a curved section, the straight section being secured to the plate surface at the end and the curved section being secured adjacent the end thereof to one side of the carriage.

31. Apparatus as in claim 8 wherein cylindrical thrust members of relatively large diameter in comparison with the diameter of the wires are mounted above and below the slots in the said walls and the wires bear against such thrust members extending therearound toward the supports.

32. Apparatus as in claim 8 wherein the supports at the resiliently mounted ends of the wires comprise brackets, each provided with openings, threaded bolts received through such openings, each bolt being secured at one end to an end of one of the wires and having an adjusting nut at its other end, a compression spring surrounding the bolt between the adjusting nut and the bracket for maintaining a yielding bias on the wire.

33. A heat-treating furnace comprising means defining an elongated chamber, a plurality of elongated supply and return nozzles, said nozzles being mounted within and each extending transversely across said chamber from one of the sides of the latter, the supply nozzles alternating with the return nozzles in interfingered relation along the length of said chamber, a supply duct paralleling and disposed along one of the sides of said chamber, each supply nozzle being connected to said duct, said duct being adapted to receive a fluid conditioning medium for delivery to points spaced along the length of said chamber through said supply nozzles, a return duct paralleling and disposed along one of the sides of said chamber, the return nozzles being individually connected to the return duct for exhausting delivered fluid medium from the interior of the chamber at points spaced along the length of such chamber located intermediate the delivery points, transverse dampers in the ducts and partitioning the latter into separate chambers, the dampers being coupled together for movement in unison, and the supply duct damper being spaced from the return duct damper longitudinally of the chamber a distance equivalent to the spacing between the delivery and exhaust points of the nozzles.

34. A heat-treating furnace comprising means defining an elongated chamber, a plurality of elongated supply and return nozzles, said nozzles being mounted within and each extending transversely across said chamber from one of the sides of the latter, the supply nozzles alternating with the return nozzles in interfingered relation along the length of said chamber, the nozzles each being bifurcated with legs adapted to straddle a longitudinal plane in the chamber to provide a path for sheet material, means providing confronting orifices on the inner surfaces of said nozzle legs, a supply duct paralleling and disposed along one of the sides of said chamber, each supply nozzle being connected to said duct, said duct being adapted to receive a fluid conditioning medium for delivery to points spaced along the length of said chamber through said supply nozzles, a return duct paralleling and disposed along one of the sides of said chamber, the return nozzles being individually connected to the return duct for exhausting delivered fluid medium from the interior of the chamber at points spaced along the length of such chamber located intermediate the delivery points, transverse dampers in the ducts and partitioning the latter into separate chambers, the dampers being coupled together for movement in unison, and the supply duct damper being spaced from the return duct damper longitudinally of the chamber a distance equivalent to the spacing between the delivery and exhaust points of the nozzles.

35. Heating and tensioning apparatus for treating continuous strip sheet material, said apparatus comprising in combination means for supporting such a sheet material strip under endwise tension and moving the tensioned strip endwise along a linear path, an elongated duct, means supporting the duct in generally parallel relation to said path, means for supplying gaseous treating medium having one characteristic to one end of the duct, means for supplying gaseous treating medium having another characteristic to the other end of the duct, a series of nozzles each connected at one end to the duct to receive gaseous treating medium from the latter, the connections being spaced along the length of the duct, said nozzles each being disposed in transverse relation to said path and each having a vent located to direct gaseous treating medium against one of the surfaces of such sheet material so moving along said path, a damper within the duct and dividing it into separate chambers for the two types of gaseous treating media supplied to its opposite ends and causing medium having the one characteristic to flow from the vents of the nozzles connected to the duct between the one end thereof and the damper and gaseous medium having the other characteristic to flow from the vents of the nozzles between the other end thereof and the damper, the damper being movable longitudinally with respect to the duct, and means connected to the damper and actuatable externally of the duct for moving the damper to different positions along the duct simultaneously to vary both the number of nozzles receiving gaseous medium having the one characteristic and the number of nozzles receiving gaseous medium having the other characteristic.

36. The method of conditioning continuous sheet material which comprises continuously advancing the material under tension over a predetermined path, directing fluid medium having one conditioning treatment characteristic simultaneously against the opposite side surfaces of the advancing material within one portion of said path, thereafter directing fluid medium having another conditioning treatment characteristic simultaneously against the same opposite side surfaces within another portion of said path and automatically adjusting the ratio between the lengths of said path portions in accordance with variations in speed of advancement of the sheet material for maintaining substantially uniform conditioning of the material regardless of its speed.

37. In a heat-treating furnace having a chamber for material to be conditioned, supply and return ducts extending along the chamber, the supply duct having spaced infeed portions at its opposite ends, the return duct having spaced outfeed portions at its opposite ends, first blower means connected to one infeed portion of the supply duct at one end of the latter for continuously furnishing thereto under pressure a fluid conditioning medium having one characteristic, second blower means connected to the other infeed portion of the supply duct at the other end of the latter for continuously furnishing thereto under pressure a fluid conditioning medium having another charactertistic, the supply duct having a series of ports spaced along its length and communicating with the conditioning chamber, damper means inside the supply duct and movable along its length and dividing its interior into two chambers one of which is continuous with said one infeed portion and the other of which is continuous with said other infeed portion, means having connection with the damper means for shifting it along the supply duct to vary the ratio of the number of said ports communicating with said one chamber to the number of said ports communicating with said other chamber, the return duct having a series of ports spaced along its length and communicating with the conditioning chamber, damper means inside the return duct and movable along its length and dividing its interior into two chambers one of which is continuous with one outfeed portion at one end of the return duct and the other of which is continuous with the other outfeed portion at the other end of the return duct, and means connecting the return duct damper means to move in unison with the supply duct damper means to vary the ratio of the return duct ports communicating with the return duct chambers similarly and concurrently with the variation of the ratio of the supply duct ports.

38. In a heat-treating furnace having a chamber for material to be conditioned, supply and return ducts extending along the chamber, the supply duct having spaced infeed portions at its opposite ends, the return duct having spaced outfeed portions at its opposite ends, first blower means connected to one infeed portion of the supply duct at one end of the latter for continuously furnishing thereto under pressure a fluid conditioning medium having one characteristic, second blower means connected to the other infeed portion of the supply duct at the other end of the latter for continuously furnishing thereto under pressure a fluid conditioning medium having another characteristic, the supply duct having a series of ports spaced along its length and communicating with the conditioning chamber, damper means inside the supply duct and movable along its length and dividing its interior into two chambers one of which is continuous with said one infeed portion and the other of which is continuous with said other infeed portion, means having connection with the damper means for shifting it along the supply duct to vary the ratio of the number of said ports communicating with said one chamber to the number of said ports communicating with said other chamber, the infeed portions of the supply duct being juxtaposed to the outfeed portions of the return duct, the juxtaposed duct portions being formed with registering openings providing spaced connecting passages between the supply and return ducts, by-pass dampers, and means mounting the by-pass dampers for swinging movement to and from closed positions across the connecting passages, and means biasing the dampers to closed positions and normally preventing the flow of conditioning medium from one duct to the other, said by-pass dampers each being adapted automatically to open the corresponding connecting passage upon a predetermined increase in pressure of the fluid conditioning medium in the corresponding infeed portion of the supply duct, whereby conditioning medium is by-passed directly into the corresponding outfeed portion of the return duct from one of the infeed portions of the supply duct upon an increase in pressure in the supply duct resulting from closure of delivery ports.

39. In a heat-treating furnace having a chamber for material to be conditioned, supply and return ducts extending along the chamber, the supply duct having spaced infeed portions at its opposite ends, the return duct having spaced outfeed portions at its opposite ends, first blower means connected to one infeed portion of the supply duct at one end of the latter for continuously furnishing thereto under pressure a fluid conditioning medium having one characteristic, second blower means connected to the other infeed portion of the supply duct at the other end of the latter for continuously furnishing thereto under pressure a fluid conditioning medium having another characteristic, the supply duct having a series of ports spaced along its length and communicating with the conditioning chamber, damper means inside the supply duct and movable along its length and dividing its interior into two chambers one of which is continuous with said one infeed portion and the other of which is continuous with said other infeed portion, means having connection with the damper means for shifting it along the supply duct to vary the ratio of the number of said ports communicating with said one chamber to the number of said ports communicating with said other chamber, the return duct having a series of ports spaced along its length and communicating with the conditioning chamber, damper means inside the return duct and movable along its length and dividing its interior into two chambers one of which is continuous with one outfeed portion at one end of the return duct and the other of which is continuous with the other outfeed portion at the other end of the return duct, means connecting the return duct damper means to move in unison with the supply duct damper means to vary the ratio of the return duct ports communicating with the return duct chambers similarly and concurrently with the variation of the ratio of the supply duct ports, the infeed portions of the supply duct being juxtaposed to the outfeed portions of the return duct, the juxtaposed duct portions being formed with registering openings providing spaced connecting passages between the supply and return ducts, by-pass dampers, and means mounting the by-pass dampers for swinging movement to and from closed positions across the connecting passages, and means biasing the dampers to closed positions and normally preventing the flow of conditioning medium from one duct to the other, said by-pass dampers each being adapted automatically to open the corresponding connecting passage upon a predetermined increase in pressure of the fluid conditioning medium in the corresponding infeed portion of the supply duct, whereby conditioning medium is by-passed directly into the corresponding outfeed portion of the return duct from one of the infeed portions of the supply duct upon an increase in pressure in the supply duct resulting from closure of delivery ports.

References Cited in the file of this patent

UNITED STATES PATENTS

| | | |
|---|---|---|
| 2,253,654 | Schroder | Aug. 26, 1941 |
| 2,343,351 | Wedler | Mar. 7, 1944 |
| 2,414,467 | Hunt | Jan. 21, 1947 |
| 2,509,741 | Miles | May 30, 1950 |
| 2,590,850 | Dungler | Apr. 1, 1952 |
| 2,671,969 | Mayer | Mar. 16, 1954 |
| 2,691,225 | Kamprath | Oct. 12, 1954 |
| 2,720,151 | Kreuttner | Oct. 11, 1955 |